(12) United States Patent
Hara et al.

(10) Patent No.: US 8,707,004 B2
(45) Date of Patent: Apr. 22, 2014

(54) COMPUTER SYSTEM AND STORAGE CONSOLIDATION MANAGEMENT METHOD

(75) Inventors: Junichi Hara, Sagamihara (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 12/731,758

(22) Filed: Mar. 25, 2010

(65) Prior Publication Data

US 2011/0185130 A1  Jul. 28, 2011

(30) Foreign Application Priority Data

Jan. 25, 2010  (JP) .................................. 2010-13562

(51) Int. Cl.
G06F 12/02  (2006.01)
(52) U.S. Cl.
USPC ............ 711/170; 711/150; 709/223; 709/226
(58) Field of Classification Search
USPC ............................ 711/170, 150; 709/223, 226
See application file for complete search history.

(56) References Cited

U.S. PATENT DOCUMENTS

| | | | | |
|---|---|---|---|---|
| 5,708,778 | A * | 1/1998 | Monot | 709/228 |
| 6,105,063 | A * | 8/2000 | Hayes, Jr. | 709/223 |
| 7,127,581 | B2 * | 10/2006 | Watanabe | 711/165 |
| 7,240,152 | B2 * | 7/2007 | Nakayama et al. | 711/112 |
| 7,426,622 | B2 * | 9/2008 | Yoder | 711/170 |
| 7,500,053 | B1 * | 3/2009 | Kavuri et al. | 711/114 |
| 7,831,795 | B2 * | 11/2010 | Prahlad et al. | 711/170 |
| 8,560,639 | B2 * | 10/2013 | Murphy et al. | 709/219 |
| 2002/0032768 | A1 * | 3/2002 | Voskuil | 709/224 |
| 2002/0138443 | A1 * | 9/2002 | Schran et al. | 705/64 |
| 2003/0236884 | A1 | 12/2003 | Yamamoto et al. | |
| 2004/0030668 | A1 | 2/2004 | Pawlowski et al. | |
| 2004/0215879 | A1 | 10/2004 | Matsunami et al. | |
| 2004/0225662 | A1 | 11/2004 | Nojima | |
| 2005/0033936 | A1 | 2/2005 | Nakano et al. | |
| 2005/0086430 | A1 * | 4/2005 | Allen et al. | 711/114 |
| 2005/0172043 | A1 | 8/2005 | Nonaka et al. | |
| 2006/0005162 | A1 * | 1/2006 | Tseng et al. | 717/107 |
| 2007/0113009 | A1 * | 5/2007 | Fujibayashi | 711/114 |
| 2008/0016311 | A1 | 1/2008 | Harada | |

FOREIGN PATENT DOCUMENTS

| | | |
|---|---|---|
| JP | 2002-222061 A | 8/2002 |
| JP | 2003-345631 A | 12/2003 |
| JP | 2004-334561 A | 11/2004 |
| JP | 2005-215947 A | 8/2005 |
| JP | 2005-275526 A | 10/2005 |
| JP | 2005-535961 A | 11/2005 |
| JP | 2008-021116 A | 1/2008 |

\* cited by examiner

Primary Examiner — Yaima Rigol
Assistant Examiner — Samuel Dillon
(74) Attorney, Agent, or Firm — Foley & Lardner LLP

(57) ABSTRACT

In order to properly use resources according to the application or search for available resources in an environment in which a block storage apparatus and a file storage apparatus coexist, knowledge and experience of applications and storage apparatuses, as well manpower were required. Thus, a policy pre-defined with a preferred type of interface and a preferred type of storage area for each type of application that is loaded in the host computers is predetermined, configuration information is collected from each storage apparatus, each intermediate storage apparatus and each host computer, respectively, a combination of a storage apparatus, an intermediate storage apparatus and a host computer that is suitable for the type of application designated by a user is detected based on the collected configuration information of each storage apparatus, each intermediate storage apparatus and each host computer, the policy, and the type of application designated by the user, and the detected combination is presented to the user.

14 Claims, 20 Drawing Sheets

| VOLUME ID | STATUS | VOLUME TYPE | CAPACITY | RAID LEVEL | DISK ID |
|---|---|---|---|---|---|
| 0 | IN USE | SAS | 500GB | 5 | 1, 2, 3, 4 |
| 1 | IN USE | SAS | 200GB | 5 | 5, 6, 7, 8 |
| 2 | UNUSED | SATA | 300GB | 5 | 9,10,11,12 |
| 3 | IN USE | VIRTUAL | 1000GB | - | - |
| 4 | UNUSED | SSD | 100GB | 5 | 13,14,15,16 |
| ⋮ | ⋮ | ⋮ | ⋮ | ⋮ | ⋮ |
| 50A | 50B | 50C | 50D | 50E | 50F |

| VOLUME ID | START LBA | END LBA |
|---|---|---|
| 0 | 0x0001af10 | 0x0002ffff |
| 0 | 0x000350f0 | 0x0004ffff |
| ⋮ | ⋮ | ⋮ |

| VOLUME ID | VIRTUAL VOLUME | | LOGICAL VOLUME | | |
|---|---|---|---|---|---|
| | START LBA | END LBA | VOLUME ID | START LBA | END LBA |
| 3 | 0x00000000000 | 0x0001af0f | 0 | 0x00000000 | 0x0001af0f |
| | 0x0001af10 | 0x0001ffff f | 0 | 0x00030000 | 0x000350ef |
| | 0x00020000 | 0x0020fff f | 0 | 0x00050000 | 0x000500ff |
| | 0x00021000 | 0x0008ffff | 1 | 0x00000000 | 0x0006efff |
| | ...... | ...... | ...... | ...... | ...... |

Fig.11

| RESOURCE ID | RESOURCE TYPE | RESOURCE DETAIL |
|---|---|---|
| FileStrA | NAS | NFS |
|  |  | CIFS |
| 53A | 53B | 53C |

| PORT ID | PORT TYPE | DESTINATION |
|---|---|---|
| FCPort1 | FC | BlockStrA |
|  |  | BlockStrB |
| FCPort2 | FC | BlockStrB |
| IPPort1 | IP | HostB |
|  |  | HostC |
|  |  | HostD |
|  |  | FileStrA |
| IPPort2 | IP | FileStrB |
|  |  | FileStrC |
| ⋮ | ⋮ | ⋮ |
| 54A | 54B | 54C |

| APPLICATION TYPE | VIRTUAL HOST IN-USE I/F | FILE STORAGE TYPE | VOLUME TYPE |
|---|---|---|---|
| DATABASE | FC | – | SSD |
| EMAIL SERVER | FC | – | SAS |
| PORTAL SERVER | NFS | NAS | SAS |
| ⋮ | ⋮ | ⋮ | ⋮ |

| RESOURCE ID | RESOURCE TYPE | RESOURCE DETAIL | PORT ID | PORT TYPE | DESTINATION |
|---|---|---|---|---|---|
| HostA | Host | Hypervisor | FCPort1 | FC | BlockStrA<br>BlockStrB |
| | | | FCPort2 | FC | BlockStrC |
| | | | IPPort1 | IP | HostB<br>HostC<br>HostD<br>FileStrA |
| | | | IPPort2 | IP | FileStrB<br>FileStrC |
| HostB | Host | Windows | ...... | ...... | ...... |
| HostC | Host | Unix | ...... | ...... | ...... |
| HostD | Host | Windows | ...... | ...... | ...... |
| FileStrA | NAS | NFS<br>CIFS | ...... | ...... | ...... |
| FileStrB | Archive | NFS<br>CIFS | ...... | ...... | ...... |
| FileStrC | Archive | NFS | ...... | ...... | ...... |
| BlockStrA | Block | SSD (500GB)<br>SAS (1000GB)<br>SATA (2000GB) | ...... | ...... | ...... |
| BlockStrB | Block | VIRTUAL | ...... | ...... | ...... |
| BlockStrC | Block | VIRTUAL | ...... | ...... | ...... |
| ⋮ | ⋮ | ⋮ | ⋮ | ⋮ | ⋮ |
| 56A | 56B | 56C | 56D | 56E | 56F |

| APPLICATION TYPE | DATA TYPE | VIRTUAL HOST IN-USE I/F | FILE STORAGE TYPE | VOLUME TYPE |
|---|---|---|---|---|
| DATABASE | Active | FC | – | SSD |
| | Archive | NFS | Archive | SAS |
| EMAIL SERVER | Active | FC | – | SAS |
| | Archive | NFS | Archive | VIRTUAL |
| PORTAL SERVER | Active | iSCSI | – | SAS |
| | Archive | NFS | Archive | VIRTUAL |
| ⋮ | ⋮ | ⋮ | ⋮ | ⋮ |
| 83A | 83B | 83C | 83D | 83E |

83

COMPUTER SYSTEM AND STORAGE CONSOLIDATION MANAGEMENT METHOD

CROSS REFERENCES

This application relates to and claims priority from Japanese Patent Application No. 2010-13562, filed on Jan. 25, 2010, the entire disclosure of which is incorporated herein by reference.

The present invention generally relates to a computer system and a storage consolidation management method, and in particular can be suitably applied to a computer system in which a file storage apparatus and a block storage apparatus coexist.

BACKGROUND

The amount of data that is being managed by companies continues to increase pursuant to the advancement of information society in recent years. Moreover, recently, the types of data are also increasing in addition to the increase in the amount of data, and such increase in the types of data is making data management in companies even more difficult.

Today, as the types of data that are being managed by companies, there are DB (database) data, document data and the like. Here, an application (DB) in the host computer that uses the DB data has a data management function of managing what kind of data is written in which location of which data storage area. Thus, the data management function that is demanded in a storage apparatus is relatively simple regarding the DB data. However, a storage apparatus is demanded of high performance regarding the data access performance such as having a short response time. Meanwhile, a document creation application in a host computer that uses the document data is only loaded with a limited data management function in light of the attribute of such application. Thus, the storage apparatus-side needs to provide the data management function for the document data.

Accordingly, since the requirements that are demanded in a storage apparatus differ depending on the type of data, the current situation is that companies and the like that use a large-scale data center use both a block storage apparatus and a file storage apparatus as storage apparatuses based on the efficient allocation of resources.

Here, a block storage apparatus is a storage apparatus for providing a data access means based on a block access interface such as a fibre channel (Fibre Channel) or an iSCSI (Internet Small Computer System Interface) and, typically, a host computer performs data access in a manner that is compliant with the SCSI standard. Specifically, a block storage apparatus provides a storage area as a volume, and a host computer designates the storage of the data read/write destination based on the ID of the volume (volume ID) and the LBA (Logical Block Address) that shows the location in that volume.

With a block storage apparatus, in many cases, the respective volumes are configured from a plurality of physical disks for the purpose of fault tolerance and performance improvement. Today, as the foregoing physical disk, various types of storage devices are being used; for instance, SSD (Solid State Disk) or SATA (Serial Advanced Technology Attachment) disk drives, SAS (Serial Attached SCSI) disk drives and the like. Since an SSD yields high performance in comparison to a case of using a SATA disk drive or a SAS disk drive, the volumes that are configured from such SSD are able to yield high performance in comparison to the volumes that are configured from a SATA disk or a SAS disk drive. Nevertheless, an SSD is more expensive in comparison to a SATA disk drive or a SAS disk drive, and the cost of volumes will also increase.

Moreover, recent block storage apparatuses are able to provide, in addition to logical volumes based on conventional RAID (Redundant Array of Inexpensive Disks) technology, virtual volumes based on the Thin Provisioning technology. A virtual volume does not have the substance of a storage area at the point in time that a volume is created and allocated to a host computer, and is a volume to which a storage area (hereinafter referred to as the "real storage area") provided by a physical disk is provided only when data is written from the host computer into the virtual volume. As a result of using a virtual volume, the capacity of a physical disk can be effectively utilized since the real storage area of a physical disk is only allocated to the location in the volume where data is actually written.

Meanwhile, a file storage apparatus is a storage apparatus for providing a data access means based on a file access interface such as an NFS (Network File System) or a CIFS (Common Internet File System). A file storage apparatus typically provides a real storage area as a file system. A host computer or an application running thereon may freely create files, which are data blocks, in a file system if authorized to do so, and may freely assign a name (file name) according to given rules. When a host computer is to access data, it may do so by designating the file name (file path), and there is no need for the host computer-side to manage in which address within the file system data is being stored. Moreover, the host computer is able to create a directory in the file system and collectively store related files therein, and additionally use functions for facilitating data management such as by referring to attribute information (metadata); for instance, file creation date/time, file update date/time and the like.

Moreover, in recent years, provided is a file storage apparatus for providing a file access interface based on XAM (eXtensible Access Method). As a result of using a file access interface based on XAM, the host computer can freely define the metadata of the respective files and use the same for data management, and thereby further facilitate data management. Thus, XAM is particularly used in the long-term storage of data.

Further, a file storage apparatus can be broadly classified into a stand-alone type and a gateway type. While the stand-alone type retains the physical disks on its own, the gateway type does not retain the physical disks or, even if it does, only retains physical disks of a limited capacity that are used for storing micro programs and management information, and adopts a mode of using the volumes provided by the other block storage apparatuses as the data storage area. Thus, a gateway type is able to allocate the physical disks or volumes that were being used for the block access interface to a file storage apparatus and divert them to the use for the file access interface, and the opposite diversion is also possible. Meanwhile, since a stand-alone type retains physical disks for exclusive use by the file storage apparatus, it is difficult to divert such physical disks to other uses. Thus, companies that use a large-scale data center often use the gateway type.

Incidentally, as inventions relating to a computer system, PCT (WO) 2005-535961 (Patent Document 1) discloses an invention relating to a multi-protocol storage appliance for supporting a file protocol and a block protocol. In addition, Japanese Published Unexamined Application No. 2003-345631 (Patent Document 2) discloses an invention relating to a computer in which different types of storage apparatuses coexist, wherein a host computer uses the storage apparatuses according to the characteristics of the individual storage apparatuses, and Japanese Published Unexamined Application No. 2005-275526 (Patent Document 3) discloses an invention for selecting the storage destination of data according to the usage thereof and thereby allocating the storage area.

SUMMARY

Based on the foregoing characteristics of the block storage apparatus and the file storage apparatus, conventionally, a block storage apparatus is often used for storing DB data, and a file storage apparatus is often used for storing or archiving document data.

Nevertheless, in order to properly use the block storage apparatus and the file storage apparatus as described above, the system administrator needs to have knowledge and experience regarding the characteristics of the applications to be loaded in the host computer as well as the characteristics and functions of the respective storage apparatuses. In addition, today, a system administrator is required to manually understand the resources such as the existing storage apparatuses and host computers and their connection relation, and manually search for the available resources, and this kind of operation is becoming a major burden on the system administrator particularly in a large-scale data center.

There is a unified storage apparatus as disclosed in Patent Document 1 as the conventional technology for overcoming the foregoing problem. A unified storage apparatus provides the functions of a block storage apparatus and a file storage apparatus with a single apparatus, and thereby facilitates the management since the management of the connection relation is no longer required, and the complexity can be concealed. Nevertheless, upon introducing the foregoing technology, since it is necessary to replace the existing block storage apparatuses and the file storage apparatuses with a unified storage apparatus, this technology is not popular in large-scale data centers that already have numerous storage apparatuses.

The present invention was devised in view of the foregoing points. Thus, an object of this invention is to propose a computer system and a storage consolidation management method which facilitate, in a large-scale data center in which numerous block storage apparatuses and file storage apparatuses coexist, the management of properly using both storage apparatuses and searching for available resources without having to replace the storage apparatuses.

In order to achieve the foregoing object, the present invention provides a computer system comprising a plurality of host computers, a plurality of storage apparatuses respectively connected to each of the host computers and which provide storage areas of respectively different characteristics to the host computers, a plurality of intermediate storage apparatuses respectively connected to each of the host computers and each of the storage apparatuses, and which provide the storage areas provided by the storage apparatuses to the host computers with an interface that is different from the storage apparatuses, and a management apparatus for managing a policy pre-defined with a preferred type of interface and a preferred type of storage area for each type of application that is loaded in the host computers. With this computer system, the management apparatus collects configuration information from each storage apparatus, each intermediate storage apparatus and each host computer, respectively, and detects a combination of a storage apparatus, an intermediate storage apparatus and a host computer that is suitable for the type of application designated by a user based on the collected configuration information of each storage apparatus, each intermediate storage apparatus and each host computer, the policy, and the type of application designated by the user, and presents the detected combination to the user.

The present invention additionally provides a resource consolidation management method in a computer system comprising a plurality of host computers, a plurality of storage apparatuses respectively connected to each of the host computers and which provide storage areas of respectively different characteristics to the host computers, and a plurality of intermediate storage apparatuses respectively connected to each of the host computers and each of the storage apparatuses, and which provide the storage areas provided by the storage apparatuses to the host computers with an interface that is different from the storage apparatuses, wherein a policy pre-defined with a preferred type of interface and a preferred type of storage area for each type of application that is loaded in the host computers is predetermined. This method comprises a first step of collecting configuration information from each storage apparatus, each intermediate storage apparatus and each host computer, respectively, a second step of detecting a combination of a storage apparatus, an intermediate storage apparatus and a host computer that is suitable for the type of application designated by a user based on the collected configuration information of each storage apparatus, each intermediate storage apparatus and each host computer, the policy, and the type of application designated by the user, and a third step of presenting the detected combination to the user.

According to the present invention, in a large-scale data center in which numerous block storage apparatuses and file storage apparatuses coexist, the proper use of both storage apparatuses and search of resources that were conventionally dependent on the knowledge, experience and manpower of administrators can be facilitated.

DESCRIPTION OF DRAWINGS

FIG. 9 is a conceptual diagram showing a configuration example of the virtual volume management table;

FIG. 11 is a conceptual diagram showing a configuration example of the resource information table;

FIG. 12 is a conceptual diagram showing a configuration example of the destination information table;

FIG. 13 is a conceptual diagram showing a configuration example of the consolidation management policy table according to the first embodiment;

FIG. 14 is a conceptual diagram showing a configuration example of the resource management table;

FIG. 21 is a conceptual diagram showing a configuration example of the consolidation management policy table according to the second embodiment;

DETAILED DESCRIPTION

An embodiment of the present invention is now explained in detail with reference to the attached drawings.

(1) First Embodiment (1-1) Configuration of Computer System of this Embodiment

Figure 1:
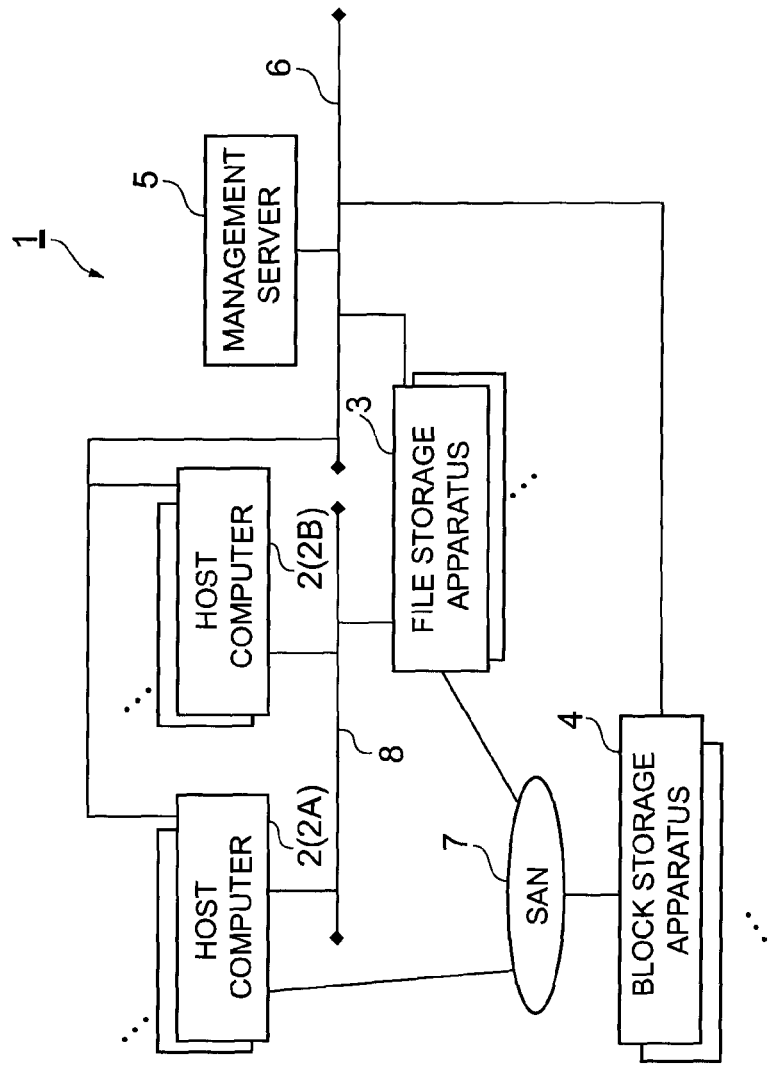
FIG. 1 is a block diagram showing the overall configuration of the computer system according to the first embodiment.

FIG. 1 shows the overall computer system 1 according to the present embodiment. The computer system 1 comprises one or more host computers 2 (2A, 2B), one or more file storage apparatuses 3, one or more block storage apparatuses 4 and a management server 5, and is configured by the foregoing components being mutually connected via a management LAN (Local Area Network) 6, which is a management network.

Moreover, certain host computers 2 (2A), file storage apparatuses 3 and block storage apparatuses 4 are connected via a SAN (Storage Area Network) 7, and certain host computers 2 (2A, 2B) and file storage apparatuses 3 are connected via a data LAN 8, which is a data transfer network.

Although FIG. 1 shows an example where only certain host computers 2 (2A) are connected to the SAN 7, all host computers 2 may be connected to both the SAN 7 and the data LAN 8. Moreover, although FIG. 1 shows an example of connecting all host computers 2 to the data LAN 8, the configuration may be such that certain host computers 2 are not connected to the data LAN 8. Further, although FIG. 1 shows a case where the management LAN 6 and the data LAN 8 are isolated, they may also be configured from a single network (LAN, for example) without being isolated.

Figure 2:
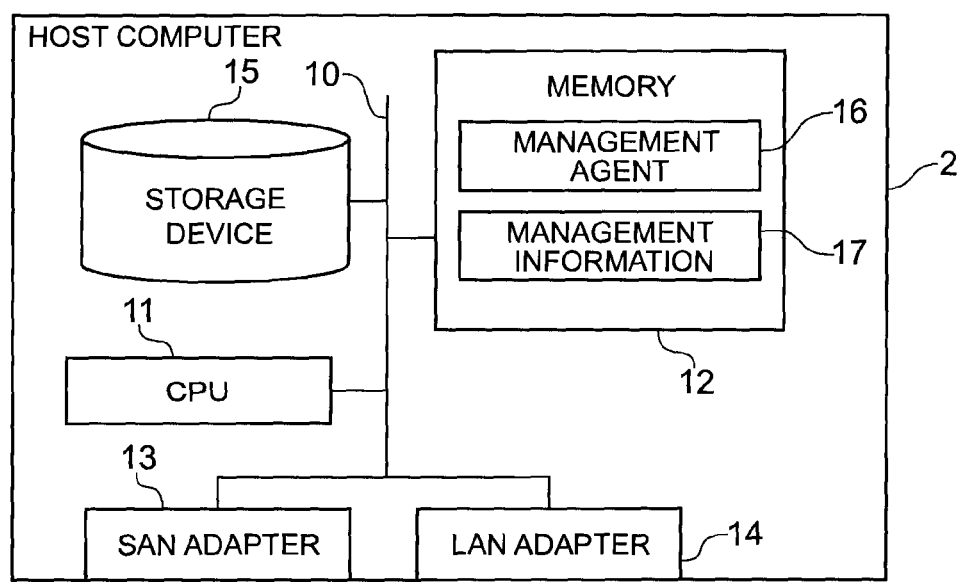
FIG. 2 is a block diagram showing the schematic configuration of the host computer.

The host computer 2 is a computer apparatus to be used by a user and comprises, as shown in FIG. 2, a CPU 11, a memory 12, a SAN adapter 13, a LAN adapter 14 and a storage device 15 which are mutually connected via an internal bus 10. The host computer 2 is connected to the file storage apparatus 3 and the management server 5 via the LAN adapter 14, and connected to the block storage apparatus 4 via the SAN adapter 13. The host computer 2 (2B) that is not connected to the SAN 7 may be configured without the SAN adapter 13.

The memory 12 of the host computer 2 stores application software (not shown), and prescribed processing according to the business operation of the user is executed by the overall host computer 2 as a result of the CPU 11 executing the application software. Data that is used by the CPU 11 upon executing the prescribed processing is read from and written into the block storage apparatus 4 via the file storage apparatus 3, or without going through the file storage apparatus 3.

A management agent 16 is running on the host computer 2. The management agent 16 is loaded from the storage device 15 into the memory 12, and executed by the CPU 11. The management agent 16 collects the configuration information and the performance information of the self-host computer 2, and retains the collected configuration information and performance information as a part of the management information 17 in the memory 12. The management agent 16 also sends the retained configuration information and performance information to the management server 5 in accordance with a request from such management server 5 However, the management agent 16 may also periodically notify the configuration information and performance information to the management server 5. The OS that is installed for operating the host computer 2 may also comprise the function corresponding to the management agent 16. Here, it is not necessary to separately provide the management agent 16 in the host computer 2.

The file storage apparatus 3 is a storage apparatus for providing a data access means based on a file access interface such as NFS or CIFS and is configured, for example, from a NAS (Network Area Storage). In the case of this embodiment, a gateway-type file storage apparatus 3 is used for virtualizing the storage area provided by the block storage apparatus 4, and providing such storage area to the host computer 2.

Figure 3:
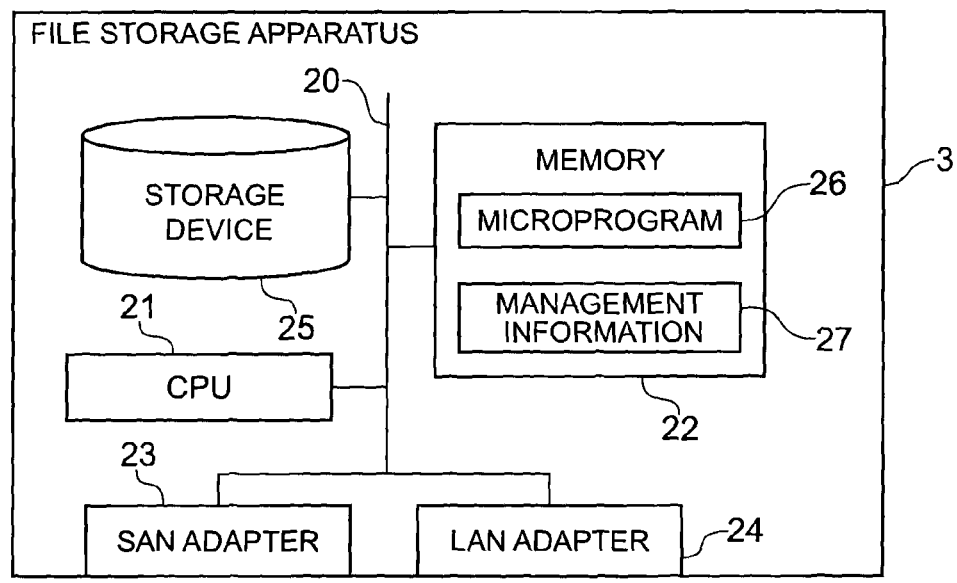
FIG. 3 is a block diagram showing the schematic configuration of the file storage apparatus.

The file storage apparatus 3 comprises, as shown in FIG. 3, a CPU 21, a memory 22, a SAN adapter 23, a LAN adapter 24 and a storage device 25 which are mutually connected via an internal bus 20. The file storage apparatus 3 is connected to the host computer 2 and the management server 5 via the LAN adapter 24, and connected to the block storage apparatus 4 via the SAN adapter 23.

A micro program 26 running on the file storage apparatus 3 controls the respective elements in the file storage apparatus 3, manages the data storage area (file system), allocates a data storage area to the host computer 2, and responds to an access request. The micro program 26 is loaded from the storage device 25 into the memory 22, and executed by the CPU 21. In the case of this embodiment, the micro program 26 collects the configuration information and performance information of the file storage apparatus 3, and retains the collected configuration information and performance information as a part of the management information 27 in the memory 22. The micro program 26 additionally has the function of sending the retained configuration information and performance information to the management server 5 according to a request from such management server 5. However, the micro program 26 may also periodically send the configuration information and performance information to the management server 5.

In the file storage apparatus 3, although the storage device 25 is used for storing the micro program 26 and the management information 27, it is not essential. If the storage device 25 is not provided, the file storage apparatus 3 simply needs to store the micro program 26 and the management information 27 in the volume provided by the block storage apparatus 4. However, a nonvolatile memory (NVRAM: Non-volatile Random Access Memory) may also be provided as a part of the memory 22 for storing the micro program 26 and the management information 27 therein.

Figure 4:
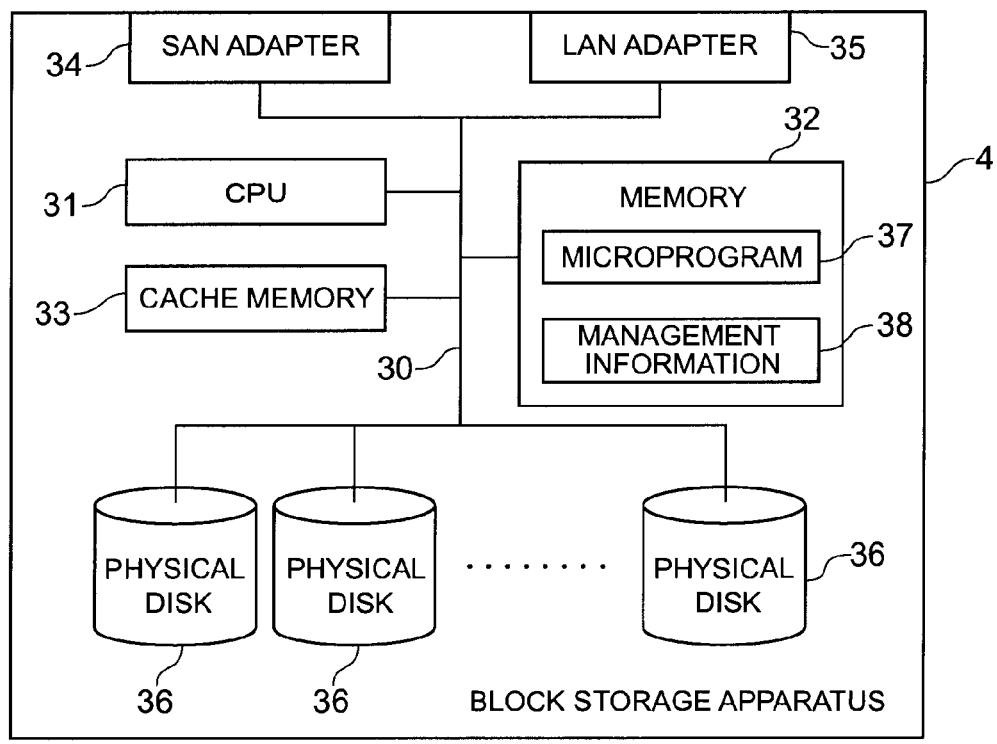
FIG. 4 is a block diagram showing the schematic configuration of the block storage apparatus.

The block storage apparatus 4 is a storage apparatus for providing a data access means based on a block access interface such as a fibre channel or iSCSI and is configured, as shown in FIG. 4, from a CPU 31, a memory 32, a cache memory 33, a SAN adapter 34, a LAN adapter 35 and one or more physical disks 36 which are mutually connected via an internal bus 30. The block storage apparatus 4 is connected to the host computer 2 and the file storage apparatus 3 via the SAN adapter 34, and connected to the management server 5 via the LAN adapter 35.

A micro program 37 running on the block storage apparatus 4 controls the respective elements in the block storage apparatus 4, manages the data storage area (volume), allocates a data storage area to the host computer 2 and the file storage apparatus 3, and responds to an access request. The micro program 37 is loaded from a specific physical disk 36 into the memory 32, and executed by the CPU 31. A nonvolatile memory may also be provided as a part of the memory 32 for storing the micro program 37 therein. In the case of this embodiment, the micro program 37 collects the configuration information and performance information of the block storage apparatus 4, and retains the collected configuration information and performance information as a part of the management information 38 in the memory 22. The micro program 37 also has the function of sending the retained configuration information and performance information to the management server 5 according to a request from such management server 5. However, the micro program 37 may also periodically notify the configuration information and performance information to the management server 5.

Figure 5:
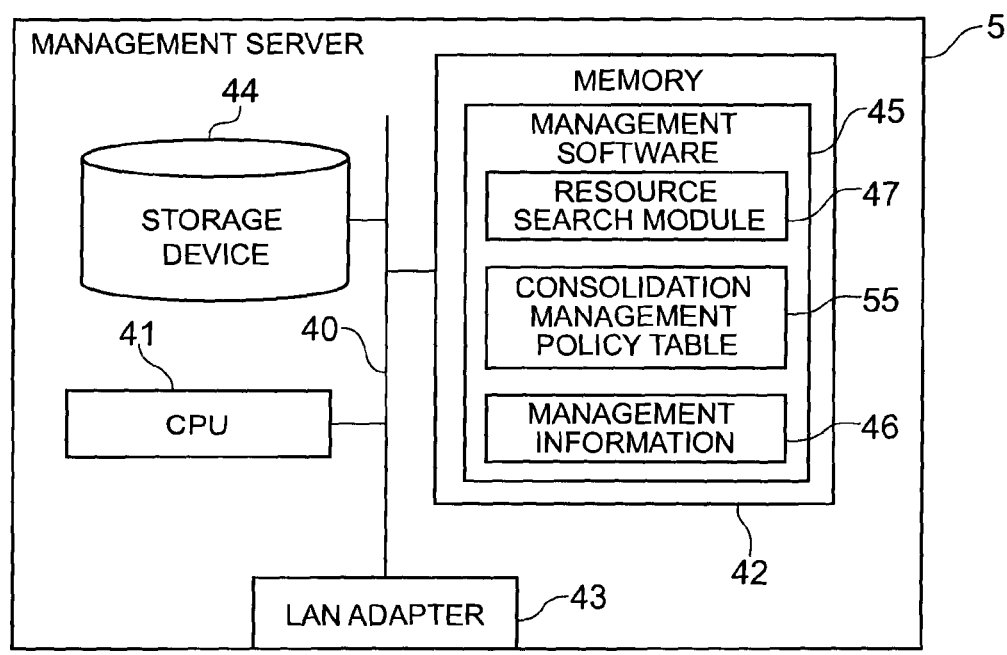
FIG. 5 is a block diagram showing the schematic configuration of the management server according to the first embodiment.

The management server 5 is a server for collectively managing the host computers 2, the file storage apparatuses 3 and the block storage apparatuses 4 existing in the computer system 1 and comprises, as shown in FIG. 5, a CPU 41, a memory 42, a LAN adapter 43 and a storage device 44 which are mutually connected via an internal bus 40, and a display means such as a display not shown. The management server 5 is connected to the host computers 2, the file storage apparatuses 3 and the block storage apparatuses 4 via the LAN adapter 43.

Management software 45 running on the management server 5 manages the host computers 2, the file storage apparatuses 3 and the block storage apparatuses 4. The management software 45 is loaded from the storage device 44 into the memory 42, and executed by the CPU 41. In the case of this embodiment, the management software 45 also has the function of collecting the configuration information and performance information from the host computers 2, the file storage apparatuses 3 and the block storage apparatuses 4, and retaining the collected configuration information and performance information as a part of the management information 46. In the mode where the host computer 2, the file storage apparatus 3 and the block storage apparatus 4 periodically send their own configuration information and performance information to the management server 5, the management software 45 retains the received configuration information and performance information as a part of the management information 46.

In the case of this embodiment, the management software 45 additionally comprises a resource search module 47 and a consolidation management policy table 48. Details regarding the resource search module 47 and the consolidation management policy table 48 will be described later.

(1-2) Management Method of Data Storage Area in Block Storage Apparatus

The management method of the data storage area (real storage area) in the block storage apparatus 4 is now explained.

The micro program 37 (FIG. 4) of the block storage apparatus 4 configures a volume with one or more physical disks 36 based on RAID technology. In the ensuing explanation, a volume that is configured based on RAID technology is referred to as a "logical volume" for differentiation from a "virtual volume" that is described later.

Figures 6, 7:
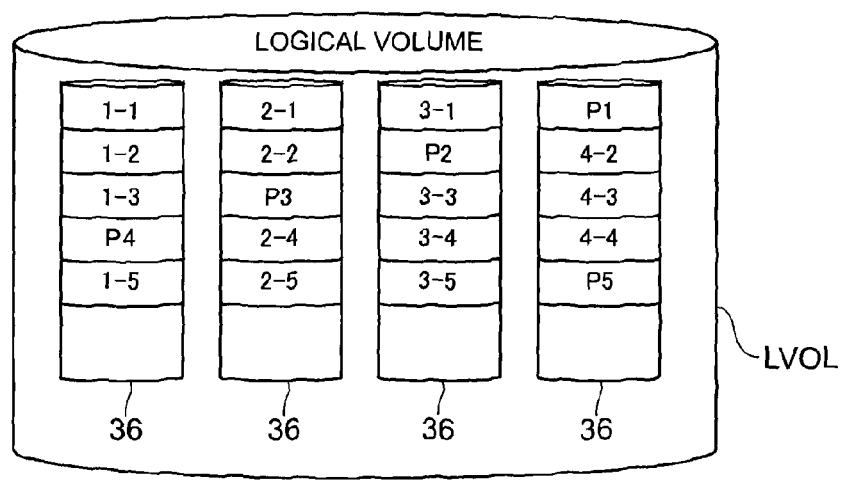
FIG. 6 is a conceptual diagram explaining the relation of the logical volume and the physical disk.
FIG. 7 is a conceptual diagram showing a configuration example of the volume management table.

FIG. 6 shows the relation of the physical disks 36 and the logical volume LVOL. In the example shown in FIG. 6, the logical volume LVOL is configured from four physical disks 36. The partial areas within the physical disks 36 labeled "1-1," "1-2," "1-3," . . . are areas that are partitioned in predetermined sizes, which are referred to as "stripes." In addition, the partial areas labeled "P1," "P2," . . . are areas storing the parity information of the corresponding stripe, and are referred to as "parity stripes."

The block storage apparatus 4 retains a volume management table 50 (FIG. 7) as a part of the management information 38 for managing the relation between the logical volume LVOL and the physical disk 36, and the status of use of volumes including the virtual volumes described later.

The volume management table 50 is configured, as shown in FIG. 7, a volume ID column 50A, a status column 50B, a volume type column 50C, a capacity column 50D, a RAID level column 50E and a disk ID column 50F.

The volume ID column 50A stores the identifier (volume ID) that is assigned to the respective volumes that were created in the block storage apparatus 4 by the micro program 37 (FIG. 4) of the block storage apparatus 4. The status column 50B stores information ("in use" or "unused") which represents the status such as the usage of the corresponding volume. Incidentally, "in use" shows a status where the volume has already been allocated to the host computer 2 or is being used as the virtual volume described later, and "unused" shows a status where the volume has not yet been allocated to the host computer 2 or is not being used as any of the virtual volumes.

The volume type column 50C stores information (volume type) representing the characteristics of the corresponding volume. For example, the volume type column 50C stores character string information of "SAS" if the corresponding volume is a logical volume configured from a SAS disk, "SATA" if the corresponding volume is a logical volume configured from a SATA disk, and "SSD" if the corresponding volume is a logical volume is configured from SSD. Moreover, if the corresponding volume is a virtual volume described later, the character string information of "VIRTUAL" is stored.

The capacity column 50D stores the capacity of the corresponding volume, and the RAID level column 50E stores the RAID level that is being used in the configuration of that volume. The RAID level column 50E is not used if the corresponding volume is a virtual volume.

The disk ID column 50F stores the identifier (disk ID) of the physical disk 36 that is being used in the configuration of the corresponding volume. The disk ID column 50F is also not used if the corresponding volume is a virtual volume.

The virtual volume is now explained. A virtual volume is a volume that does not have a real storage area for storing data at the point in time that it is created, and a real storage area of the physical disk 36 is dynamically allocated thereto in accordance with a write access request from the host computer 2 for writing data into such virtual volume.

Figures 8, 10:
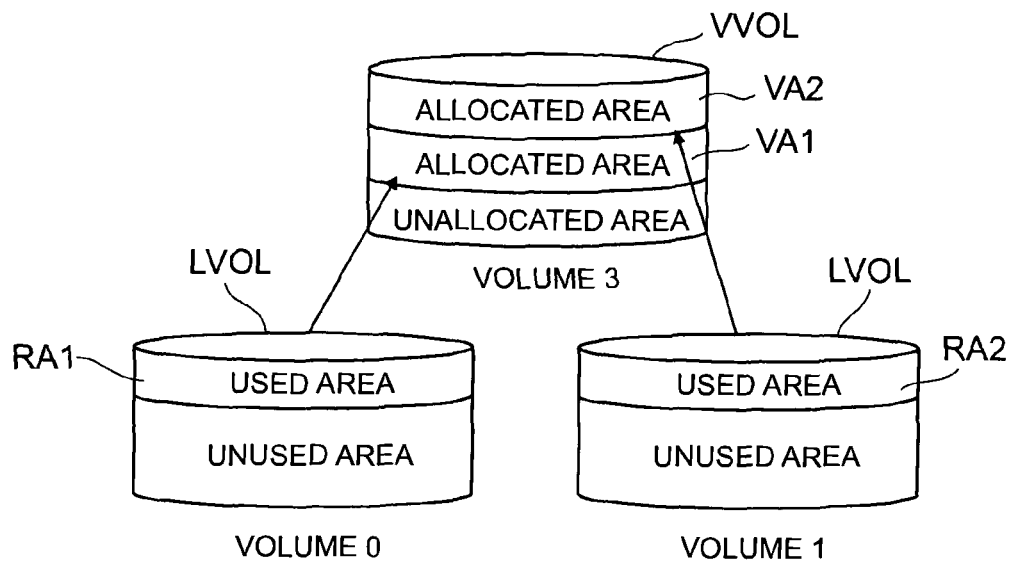
FIG. 8 is a conceptual diagram explaining the relation of the virtual volume and the logical volume.
FIG. 10 is a conceptual diagram showing a configuration example of the unused area management table.

FIG. 8 shows the relation of the virtual volume VVOL and the logical volume LVOL. As shown in FIG. 8, the allocation of a real storage area to a virtual volume VVOL is often performed not by directly allocating a real storage area provided by the physical disk 36, but by configuring a logical volume LVOL in the real storage area provided by the physical disk 36, and thereafter allocating a partial area of that logical volume LVOL.

If the micro program 37 of the block storage apparatus 4 receives a data write request from the host computer 2 for writing data into the virtual volume VVOL, it allocates unused real storage areas RA1, RA2 among the real storage areas that are partitioned in predetermined sizes from the foregoing logical volume LVOL to the storage areas VA1, VA2 in the virtual volume VVOL designated as the data write destination in the write access request.

Thus, the micro program 37 of the block storage apparatus 4 retains a virtual volume management table 51 as shown in FIG. 9 and an unused area management table 52 as shown in FIG. 10 as a part of the management information 38 (FIG. 4) for managing the relation of the virtual volume VVOL and the logical volume LVOL, allocation status of the real storage area to the virtual volume VVOL, and status of use in the logical volume LVOL.

The virtual volume management table 51 is a table for managing the correspondence of the respective storage areas in the virtual volume VVOL and the real storage area of the logical volume LVOL and is configured, as shown in FIG. 9, from a virtual volume column 51A and a logical volume column 51B.

The virtual volume column 51A is configured from a volume ID column 51AA, a start LBA column 51AB and an end LBA column 51AC, and the volume ID column 51AA stores the identifier (volume ID) of the volume that is assigned to the virtual volume VVOL. The start LBA column 51AB and the end LBA column 51AC respectively store the start LBA and the end LBA of the storage area to which a real storage area is allocated from the logical volume LVOL among the storage areas in that virtual volume VVOL.

The logical volume column 51B is similarly configured from a volume ID column 51BA, a start LBA column 51BB and an end LBA column 51BC, and the volume ID column 51BA stores the identifier (volume ID) of the logical volume LVOL for providing a real storage area that was allocated to a storage area of the corresponding virtual volume VVOL. The start LBA column 51BB and the end LBA column 51BC respectively store the start LBA and the end LBA of the real storage area in that logical volume LVOL that was allocated to the virtual volume VVOL.

Accordingly, FIG. 9 shows that real storage areas from "0x00000000" to "0x0001af0f" in the logical volume LVOL assigned with the volume ID of "0" are allocated to storage areas from "0x00000000" to "0x0001af0f" in the virtual volume VVOL assigned with the volume ID of "3."

Meanwhile, the unused area management table 52 is a table for managing the real storage area (hereinafter referred to as the "unused real storage area") that is not allocated to any virtual volume VVOL among the real storage areas in the respective logical volume LVOL for allocating a real storage area to the virtual volume VVOL and is configured, as shown in FIG. 10, a volume ID column 52A, a start LBA column 52B and an end LBA column 52C.

The volume ID column 52A stores the volume ID of the logical volume LVOL having an unused real storage area, and the start LBA column 52B and the end LBA column 52C respectively store the start LBA and the end LBA of the unused real storage area in the corresponding logical volume LVOL.

Accordingly, FIG. 10 shows that the real storage area in which the address in the logical volume LVOL assigned with the volume ID of "0" that is within the range of "0x0001af10" to "0x0002ffff" and the real storage area within the range of "0x000350f0" to "0x0004ffff" have not yet been allocated to any of the virtual volumes VVOL.

(1-3) Resource Consolidation Management Function of this Embodiment

The resource consolidation management function loaded in the management server 5 is now explained.

In the case of this embodiment, the management server 5 is loaded with a resource consolidation management function for collecting and managing configuration information from the respective host computers 2, file storage apparatuses 3 and block storage apparatuses 4, searching for the host computer 2, the file storage apparatus 3 and the block storage apparatus 4 as well as their connection mode (hereinafter referred to as the "resource configuration" or "resource combination" as appropriate) which are optimal for the application to the newly installed as designated by the system administrator based on the foregoing configuration information and a predefined policy, and presenting the search result to the system administrator.

As means for executing the processing based on the foregoing resource consolidation management function, the respective memories 12, 22, 32 (FIG. 2 to FIG. 4) of the host computers 2, the file storage apparatuses 3 and the block storage apparatuses 4 store, as a part of the management information 17, 27, 38 (FIG. 2 to FIG. 4), a resource information table 53 shown in FIG. 11 and a destination information table 54 shown in FIG. 12, respectively. Moreover, the memory 42 (FIG. 5) of the management server 5 stores a resource search module 47 and a consolidation management policy table 55 shown in FIG. 13 as a part of the management software 45 (FIG. 5), and stores a resource management table 56 shown in FIG. 14 as a part of the management information 46.

The resource information table 53 is a table for retaining the configuration information of the self resource (host computer 2, file storage apparatus 3 or block storage apparatus 4) that was collected by the management agent 16 (FIG. 2) or the micro programs 26, 37 (FIG. 3, FIG. 4) and is configured, as shown in FIG. 11, from a resource ID column 53A, a resource type column 53B and a resource detail column 53C.

The resource ID column 53A stores the identifier that is unique to that resource which is assigned in advance by the system administrator or the management server 5. For example, with the resource information table 53 retained by the host computer 2 or the file storage apparatus 3, the host name of that host computer 2 or file storage apparatus 3 is stored in the resource ID column 53A, and, with the resource information table 53 retained by the block storage apparatus 4, the serial number of the block storage apparatus 4 is stored in the resource ID column 53A.

The resource type column 53B stores the type of that resource. For example, with the resource information table 53 retained by the host computer 2, the character string information of "Host" is stored in the resource type column 53B, and, with the resource information table 53 retained by the block storage apparatus 3, the character string information of "Block" is stored in the resource type column 53B. Moreover, with the resource information table 53 retained by the file storage apparatus 3, the character string information of "NAS" is stored in the resource type column 53B if the file storage apparatus 3 is to be normally used, and the character string information of "Archive" is stored in the resource type column 53B if the file storage apparatus 3 is to be used as an archive.

The resource detail column 53C stores the detailed information concerning that resource. For example, with the resource information table 53 retained by the host computer 2, the type of OS (Operating System) that is loaded in that host computer 2 is stored in the resource detail column 53C. However, if virtualization software (Hypervisor), and not an OS, is running on that host computer 2, the character string information of "Hypervisor" is stored in the resource detail column 53C. With the resource information table 53 retained by the file storage apparatus 3, the type of file access interface (for example, NFS, CIFS or XAM) which is providable by that file storage apparatus 3 is stored in the resource detail column 53C.

With the resource information table 53 retained by the block storage apparatus 4, the volume type and maximum capacity of the volume which is providable by that block storage apparatus 4 are stored in the resource detail column 53C. Type and other information are stored in the resource detail column 53C only for volumes in which the information of "unused" is stored in the status column 50B (FIG. 7) of the volume management table 50 (FIG. 7). Moreover, as the maximum capacity, the maximum capacity of the same volume type is registered among the foregoing volumes (volumes in which the information of "unused" is stored in the status column 50B of the volume management table 50). However, the maximum capacity is not registered for volumes in which the volume type is "VIRTUAL."

The destination information table 54 is a table for managing the destination of the self resource and is configured, as shown in FIG. 12, from a port ID column 54A, a port type column 54B and a destination column 54C.

The port ID column 54A stores the identifier (port ID) of the respective ports provided to that resource. The port type column 54B stores the type of the corresponding port. For example, the character string information of "FC" is stored for the ports of the SAN adapters 13, 23, 34 (FIG. 2 to FIG. 4), and the character string information of "IP" is stored for the ports of the LAN adapters 14, 24, 35 (FIG. 2 to FIG. 4). The destination column 54C stores the identifier of the other resources that can be reached from the corresponding port.

Meanwhile, the resource search module 47 is a program for referring to the consolidation management policy table 55 and the resource management table described later, searching the resource configuration that is optimal for the application type designated by the system administrator, and presented the resource configuration that was detected in the search to the system administrator. In the ensuing explanation, although there are cases where the processing entity of the various types of processing is explained as the "management software" or the "resource search module," it goes without saying that, in reality, the processing is executed by the CPU 41 of the management server 5 based on the "management software" or the "resource search module."

The consolidation management policy table 55 is a table that is pre-defined with the optimal interface type and volume type for each type of application and is configured, as shown in FIG. 13, an application type column 55A, a virtual host in-use interface column 55B, a file storage type 55C and a volume type column 55D.

The application type column 55A stores the type of the respective applications that are loaded in the host computer 2. As the foregoing "type," there are "database," "email server," "portal server" and the like. The virtual host in-use interface column 55B stores the interface (for example, FC, NFS or CIFS) to be used when allocating a data storage area to the virtualization software (Hypervisor) layer upon installing the corresponding application in the virtual host.

The file storage type column 55C stores the type of the file storage apparatus 3 to be used in installing the corresponding application. For example, the character string information of "NAS" is stored when a standard file storage apparatus 3 is to be used, and the character string information of "Archive" is stored when using a file storage apparatus 3 that specializes in the long-term storage of data, respectively.

The volume type column 55D registers the type (volume type) of the volume in the block storage apparatus 4 to be used upon installing the corresponding application. As this kind of volume type, there are SSD (Solid State Drive), SAS, SATA and the like.

A consolidation management policy table 55 that is created in advance may be retained in the management software 45 (FIG. 5) of the management server 5, or an interface that allows the creation, change or deletion of the subject matter thereof may be provided so that the system administrator can freely create or change such consolidation management policy table 55.

The resource management table 56 is a table that is used by the management server 5 for managing the configuration of the respective host computers 2, the file storage apparatuses 3 and the block storage apparatuses 4, and is created by the resource search module 47 based on the configuration information and performance information that were respectively acquired by the management software 45 from the host computer 2, the file storage apparatus 3 and the block storage apparatus 4. The resource management table 56 is configured, as shown in FIG. 13, a resource ID column 56A, a resource type column 56B, a resource detail column 56C, a port ID column 56D, a port type column 56E and a destination column 56F.

The resource ID column 56A, the resource type column 56B and the resource detail column 56C respectively store the same information as the information that is respectively stored in the resource ID column 53A, the resource type column 53B or the resource detail column 53C of the resource information table 53 described above with reference to FIG. 11. The port ID column 56D, the port type column 56E and the destination column 56F respectively store the same information as the information that is respectively stored in the port ID column 54A, the port type column 54B and the destination column 54C described above with reference to FIG. 12.

(1-4) Search Condition Designation Screen

Figure 15:
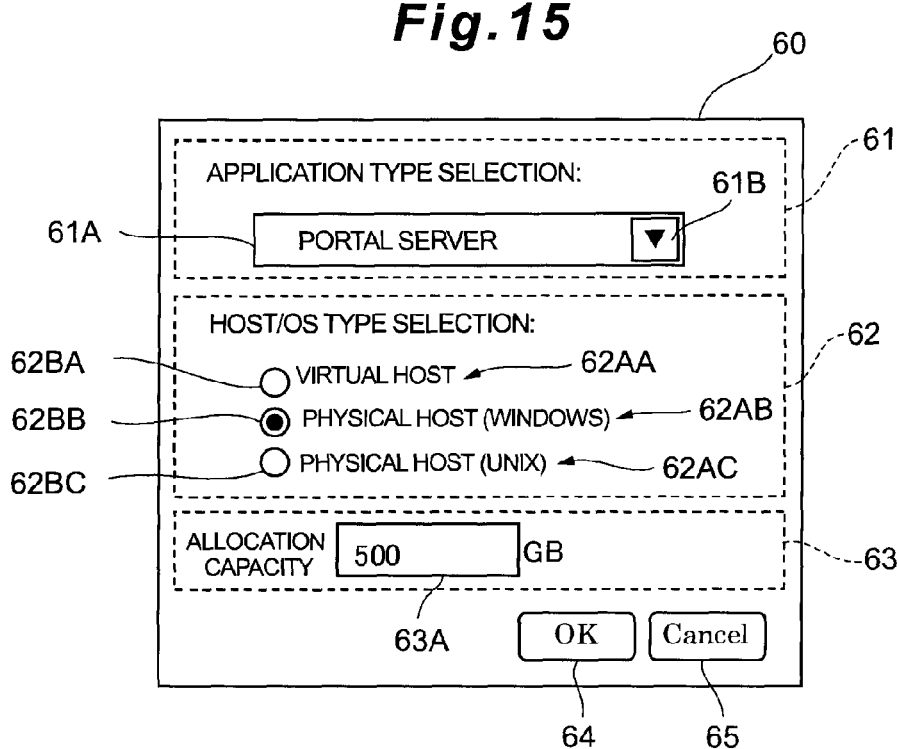
FIG. 15 is a schematic diagram showing a configuration example of the search condition designation screen according to the first embodiment.

FIG. 15 shows a configuration example of a search condition designation screen 60 to be displayed on the management server 5 based on prescribed operations. When the system administrator is to install a new application in any one of the host computers 2, it can use the search condition designation screen 60 to search for a combination of the host computer 2, the file storage apparatus 3 and the block storage apparatus 4 that is optimal for the type of that application (application type).

In reality, the search condition designation screen 60 is configured from an application type selection field 61, a host/OS type selection field 62, an allocation capacity field 63, an OK button 64 and a cancel button 65.

The application type selection field 61 is provided with a selected application display unit 61A and a pull down button 61B and, by clicking the pull down button 61B, a pull down menu (not shown) listing all application types registered in the consolidation management policy table 55 (FIG. 13) can be displayed. Consequently, the system administrator is able to select the application type of the application to be newly installed among the application types that are listed in the pull down menu, and thereby display such application type on the selected application display unit 61A.

The host/OS type selection field 62 displays the options 62AA to 62AC representing the type of each host computer 2 ("physical host" or "virtual host") that is registered in the resource management table 56 (FIG. 14), and the type of OS ("Windows (registered trademark)" or "Unix") that is loaded in that host computer 2, and the radio buttons 62BA to 62BC are displayed in correspondence with each of the foregoing options 62AA to 62AC. Consequently, the system administrator is able to select the type of host computer 2 to become the installation destination of the application to be newly installed and the OS type that is loaded in that host computer 2 by turning ON the radio buttons 62BA to 62BC corresponding to the options 62AA to 62AC that represent the intended host computer type as the host computer 2 to which the application is to be installed, and the intended OS type as the OS that is loaded in that host computer 2.

For example, in the case of FIG. 15, "virtual host" is selected if the application is to be run on a virtual host created with virtualization software (Hypervisor), and "physical host" is selected if the application is to be directly run on the host computer 2 without using the virtualization software. In the case of selecting the "physical host," "physical host (Windows (registered trademark))" is selected if selecting a host computer 2 loaded with "Windows (registered trademark)" as the OS, and "physical host (Unix)" is selected if selecting a host computer 2 loaded with "Unix" as the OS. The combination of the type of host computer and the type of OS shown in FIG. 15 is merely an example, and if there is a host computer 2 loaded with another OS in the computer system 1, options corresponding to that host computer 2 will also be displayed.

The allocation capacity field 63 is provided with an allocation capacity display unit 63A, and the system administrator is able to input, in the allocation capacity display unit 63A, the capacity of the data storage area to be allocated to the new application to be installed by operating the management server 5.

With the search condition designation screen 60, by displaying the application type of the new application to be installed on the selected application display unit 61A of the application type selection field 61, selecting the host computer 2 to which that application is to be installed and the type of OS that is loaded in the host computer 2 with the host/OS type selection field 62, displaying the capacity of the data storage area to be allocated to that application on the allocation capacity display unit 63A, and thereafter clicking the OK button 64, it is possible to cause the management server 5 to search for the host computer 2 to which the application is to be installed and the file storage apparatus 3 and the block storage apparatus 4 to be combined with that host computer 2 according to the input conditions (this search processing is hereinafter referred to as the "first resource configuration search processing"). The search condition designation screen 60 can be closed by clicking the cancel button 65. Here, the foregoing first resource configuration search processing is not executed.

(1-5) Search Result Display Screen

Figure 16:
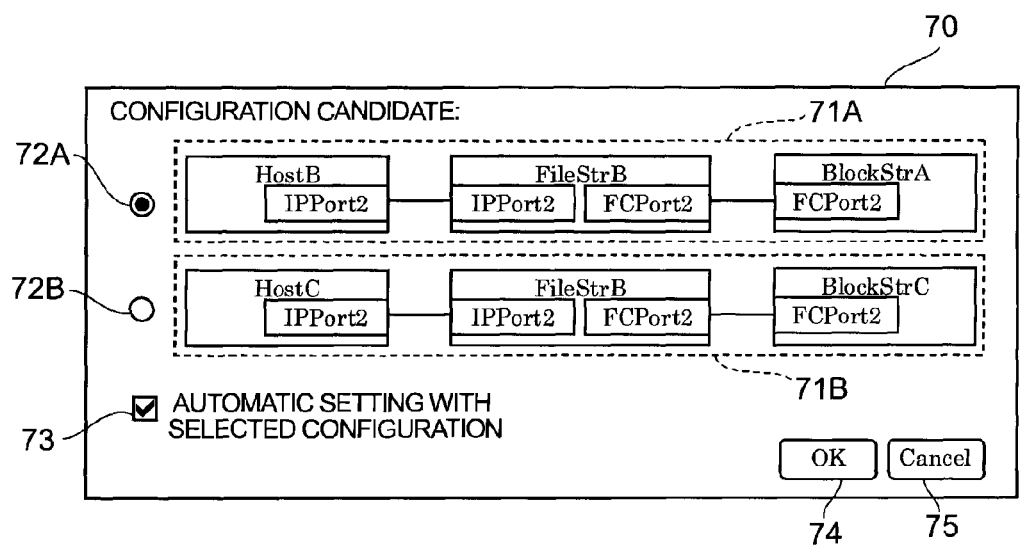
FIG. 16 is a schematic diagram showing a configuration example of the search result display screen according to the first embodiment.

Meanwhile, FIG. 16 shows a configuration example of the search result display screen 70 to be displayed on the management server 5 as a result of executing the foregoing first resource configuration search processing.

The search result display screen 70 displays the resource configuration that is optimal for the new application to be installed as detected in the first resource configuration search processing as schematic diagrams 71A, 71B including the resource ID of the resources and the port ID of the ports to be used by the foregoing resources in the connection with other resources.

If a plurality of resource configurations are detected in the foregoing first resource configuration search processing, the search result display screen 70 displays the schematic diagrams 71A, 71B representing the connection mode of the respective resources in the resource configuration preferentially from the resource configuration with the highest priority (in this embodiment, displayed at the upper part of the search result display screen 70).

Consequently, the system administrator will be able to create a resource configuration that is optimal for that application by referring to the search result display screen 70, manually referring to the schematic diagrams 71A, 71B of the intended resource configuration, and set the connection of each of the corresponding resources with the other resources.

However, if a check is placed in a check box 73 provided at the lower left of the search result display screen 70 and a plurality of schematic diagrams 71A, 71B of the resource configuration are still displayed, the setting may be automatically made by turning ON (displaying) the corresponding radio button 72A, 72B and selecting one intended resource configuration, and clicking the OK button 74 displayed at the lower right of the search result display screen 70.

Here, the management server 5 (more precisely, the resource search module 47 of the management server 5) sets the connection of these resources with the other resources by controlling each of the corresponding resources via the management LAN 6 (FIG. 1) and connecting them with the connection mode shown in the schematic diagrams 71A, 71B displayed on the search result display screen 70.

The search result display screen 70 can be closed by clicking the cancel button 75 displayed at the lower right of the screen.

(1-6) First Resource Configuration Search Processing

Figure 17:
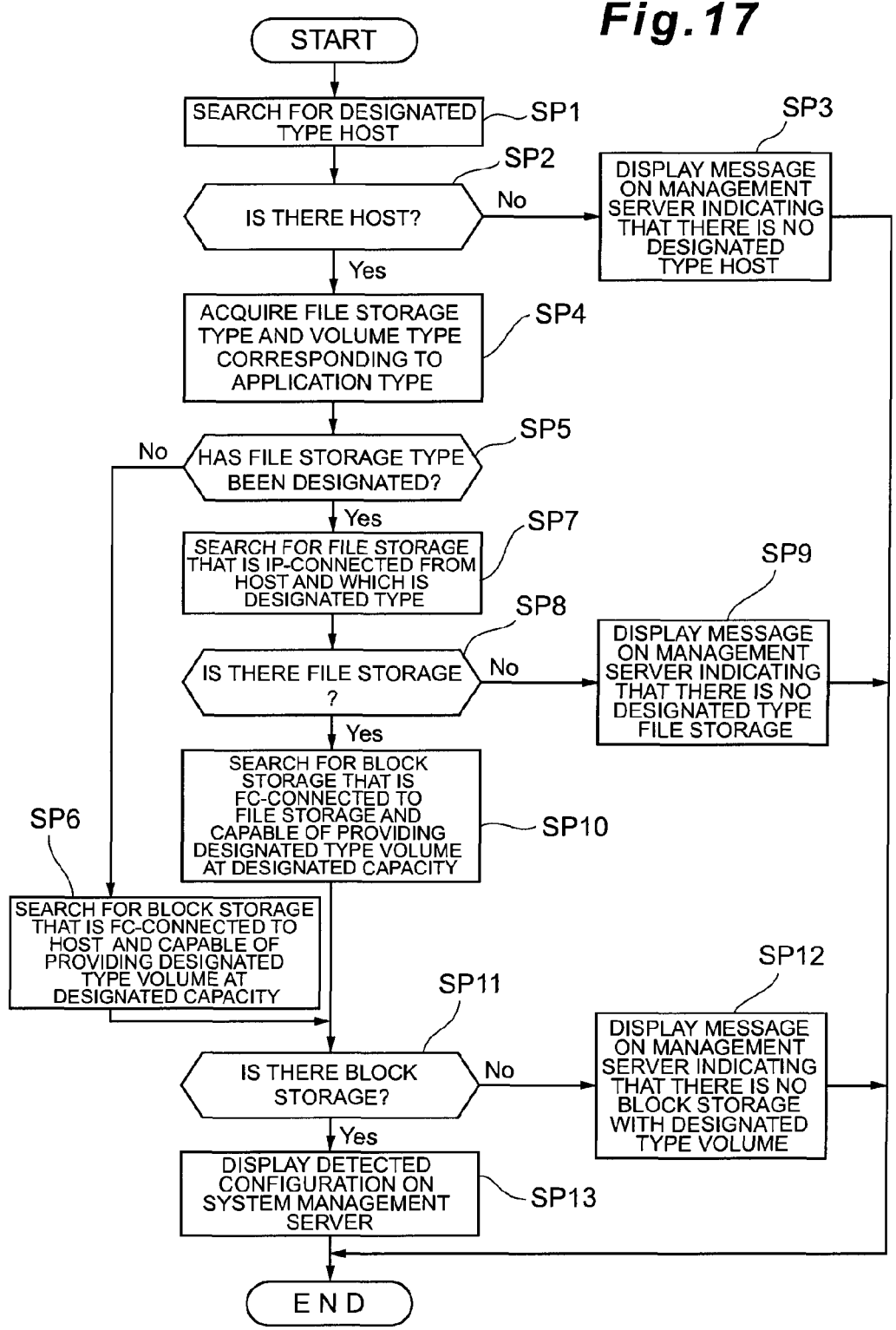
FIG. 17 is a flowchart showing the processing routine of the first resource configuration search processing.

FIG. 17 shows the processing routine of the first resource configuration search processing that is executed by the resource search module 47 (FIG. 5) of the management server 5 when the system administrator performs the necessary input operations on the foregoing search condition designation screen 60 and thereafter clicks the OK button 64.

When the OK button 64 is clicked after the necessary input operations are performed on the search condition designation screen 60, the resource search module 47 starts the first resource configuration search processing shown in FIG. 16, and foremost searches for the host computer 2 of the type designated by the system administrator on the search condition designation screen 60 from the resource management table 56 (FIG. 14) (SP1).

Specifically, if "virtual host" is selected as the type of the host computer 2 in the host/OS type selection field 62 of the search condition designation screen 60, the resource search module 47 searches for an entry in which the character string information of "Host" is stored in the resource type column 56B of the resource management table 56, and in which the character string information of "Hypervisor" is stored in the resource detail column 56C of the resource management table 56. Moreover, if "physical host" is selected as the type of the host computer 2 in the host/OS type selection field 62 of the search condition designation screen 60, the resource search module 47 searches for an entry in which the character string information of "Host" is stored in the resource type column 56B of the resource management table 56, and in which same OS type as the OS type designated in the host/OS type selection field 62 of the search condition designation screen 60 is stored in the resource detail column 56C of the resource management table 56.

Subsequently, the resource search module 47 determines whether it was possible to detect the host computer 2 of the type that was designated by the system administrator on the search condition designation screen 60 based on the foregoing search (SP2). If the resource search module 47 obtains a negative result in the foregoing determination, it displays a warning on the management server 5 to the effect that the host computer 2 of the designated type does not exist in the system (SP3), and thereafter error ends the first resource configuration search processing.

Meanwhile, if the resource search module 47 obtains a positive result in the determination at step SP2, it refers to the consolidation management policy table 55 (FIG. 13) and acquires the type of file storage apparatus 3 and the type of volume that are pre-defined in relation to the type of application to be newly installed as designated on the search condition designation screen 60 (SP4).

The resource search module 47 thereafter determines whether it was possible to acquire the type of file storage apparatus 3 to be combined with the type of application to be newly installed (whether the type of file storage apparatus 3 is defined in the consolidation management policy table 55) based on the acquisition result at step SP4 (SP5).

If the resource search module 47 obtains a negative result in the foregoing determination, it searches for a block storage apparatus 4 that is connected to the host computer 2 via the SAN 7 and capable of providing a volume of the type designated in the consolidation management policy table 55 in the capacity designated in the search condition designation screen 60 (SP6).

Specifically, the resource search module 47 refers to the resource management table 56 and searches for a block storage apparatus 4 in which, among the entries of the host computer 2 that was detected in the search at step SP1, its resource ID is stored in the destination column 56F of the entry in which the character string information of "FC" is stored in the port type column 56E, the character string information of "Block" is stored in the resource type column 56B of the corresponding entry in the resource management table 56, the character string representing the same volume type as the volume type that was acquired at step SP4 is stored in the resource detail column 56C of the foregoing corresponding entry, and the locatable capacity stored in the resource detail column 56C is not less than the capacity of the data storage area designated on the search condition designation screen 60. If the resource search module 47 detects a corresponding block storage apparatus 4 in the foregoing search, it stores the port ID of the port in the file storage apparatus 3 in which its resource ID is included in the destination. When the resource search module 47 ends this search, it proceeds to step SP11.

Meanwhile, if the resource search module 47 obtains a positive result in the determination at step SP5, it searches for a file storage apparatus 3 that is connected to any one of the one or more host computers 2 detected in the search at step SP1 via the data LAN 8 (FIG. 1), and of the type that was acquired at step SP4 (SP7).

Specifically, the resource search module 47 refers to the resource management table 56 and searches for a file storage apparatus 3 in which, among the entries of the host computer 2 that was detected in the search at step SP1, its resource ID is stored in the destination column 56F of the entry in which the character string information of "IP" is stored in the port type column 56E, the character string information representing the same file storage type as the file storage type acquired at step SP4 is stored in the resource type column 56B of the corresponding entry in the resource management table 56, and a file access interface available to the OS is stored in the resource detail column 56C of the foregoing corresponding entry. As the "file access interface available to the OS," this will be CIFS if the OS is "Windows (registered trademark)" and will be NFS if the OS is "Unix." If the resource search module 47 detects a corresponding file storage apparatus 3 in the foregoing search, it stores the port ID of the port in the host computer 2 in which its resource ID is included in the destination.

Subsequently, the resource search module 47 determines whether it was possible to detect a corresponding file storage apparatus 3 in the foregoing search (SP8). If the resource search module 47 obtains a negative result in the foregoing determination, it displays a warning on the management server 5 to the effect that the file storage apparatus 3 of the designated type does not exist in the system (SP9), and thereafter error ends the first resource configuration search processing.

Meanwhile, if the resource search module 47 obtains a positive result in the determination at step SP8, it searches for a block storage apparatus 4 that is connected to any one of the one or more file storage apparatuses 3 detected in the search at step SP7 via the SAN 7 (FIG. 1) and capable of providing the volume of the volume type acquired at step SP4 in the designated capacity (SP10).

Specifically, the resource search module 47 refers to the resource management table 56 (FIG. 14) and searches for a block storage apparatus 4 in which, among the entries of the file storage apparatus 3 detected in the search at step SP7, its resource ID is stored in the destination column 56F of the entry in which the character string information of "FC" is stored in the port type column 56E, the character string information of "Block" is stored in the resource type column 56B of the corresponding entry in the resource management table 56, the character string information representing the same volume type as the volume type acquired at step SP4 is stored in the resource detail column 56C of the foregoing corresponding entry, and the locatable capacity stored in the resource detail column 56C is not less than the capacity of the data storage area designated on the search condition designation screen 60. If the resource search module 47 detects a corresponding block storage apparatus 4 in the foregoing search, it stores the port ID of the port in the file storage apparatus 3 in which its resource ID is included in the destination.

Subsequently, the resource search module 47 determines whether it was possible to detect a corresponding block storage apparatus 4 in the search at step SP6 or step SP10 (SP11) and, upon obtaining a negative result, displays a warning on the management server 5 to the effect that a block storage apparatus 4 for providing a volume of the designated type does not exist (SP12), and thereafter error ends the first resource configuration search processing.

Meanwhile, if the resource search module 47 obtains a positive result in the determination at step SP11, it displays, on the management server 5, the search result display screen 70 depicting the schematic diagrams 71A, 71B of the resource configuration that was detected in the processing of step SP1 to step SP10 (SP13), and thereafter ends the first resource configuration search processing.

Figure 18:
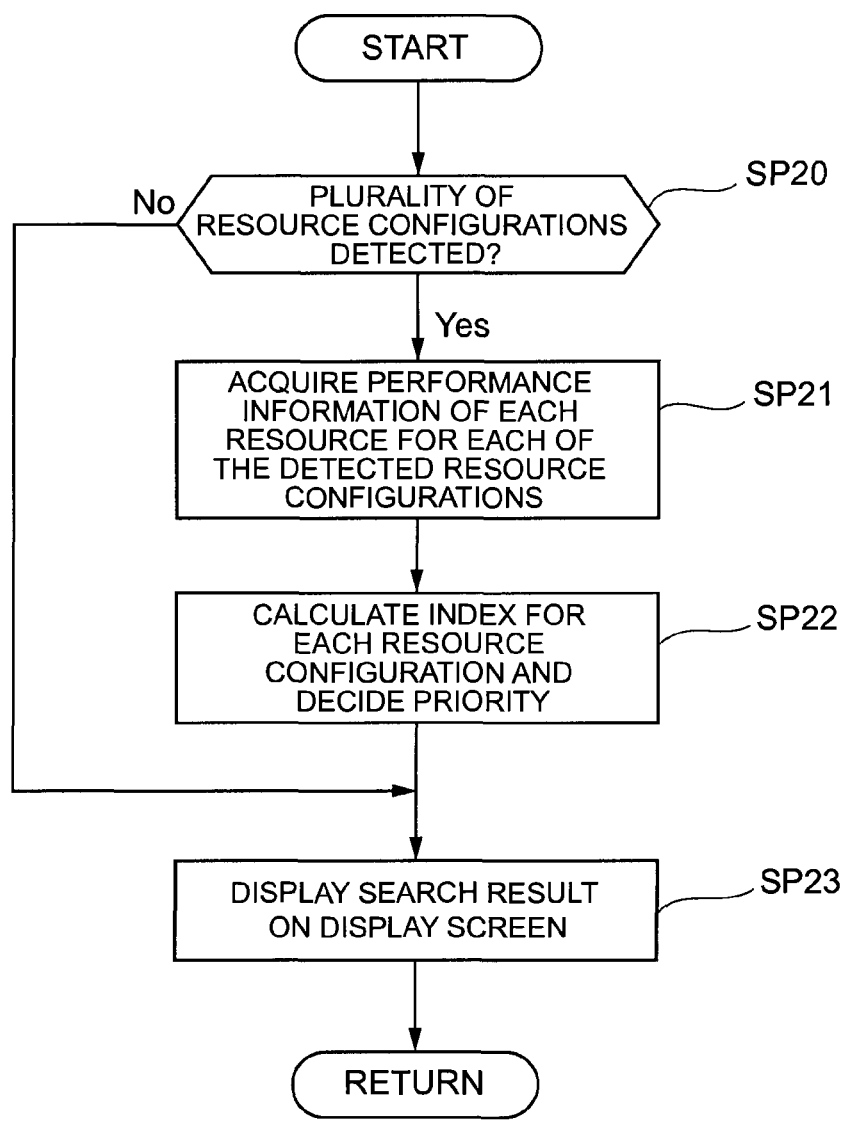
FIG. 18 is a flowchart showing the processing routine of the search result display processing.

The specific processing contents of the processing that is executed by the resource search module 47 at step SP13 of the first resource configuration search processing (hereinafter referred to as the "search result display processing") are shown in FIG. 18.

When the resource search module 47 proceeds to step SP13 of the first resource configuration search processing, it starts the search result display processing shown in FIG. 18, and foremost determines whether a plurality of resource configurations were detected in the processing of step SP1 to step SP10 of the first resource configuration search processing (SP20).

If the resource search module 47 obtains a negative result in the foregoing determination, it displays, on the management server 5, the search result display screen 70 (FIG. 16) depicting the schematic diagrams 71A, 71B of one resource configuration that was detected in the processing of step SP1 to step SP10 of the first resource configuration search processing (SP23), thereafter ends the search result display processing and returns to the first resource configuration search processing.

Meanwhile, if the resource search module 47 obtains a positive result in the determination at step SP20, it acquires the performance information from each resource (host computer 2, file storage apparatus 3 and block storage apparatus 4) configuring that resource configuration for each resource configuration that was detected in the processing of step SP1 to step SP10 of the first resource configuration search processing (SP21).

Specifically, the resource search module 47 acquires, for each of the foregoing resource configurations, the utilization (CPU utilization) of the CPU 11, 21, 31 (FIG. 2 to FIG. 4) from each resource, and the utilization (port utilization) of each port that is used by the foregoing resources in the resource configuration for connecting to the other resources.

With respect to the calculation period (averaging period) for calculating the CPU utilization of the respective resources and the port utilization of the respective ports, such information may be retained in advance by the management software 45 (FIG. 5), the calculation period may be specified in the respective resources in the system in advance, or the resource search module 47 may specify the calculation period upon requesting the transfer of the performance information to the respective resources configuring the foregoing resource configuration.

Subsequently, the resource search module 47 determines the priority for each resource configuration based on the CPU utilization in the respective resources and the port utilization of the respective ports in each of the resource configurations acquired as described above (SP22).

Here, as the priority determination method, considered may be a first method that determines the priority based on the simple average of the CPU utilization and the port utilization, a second method of performing weighting to each type of resource, a third method of performing weighting to each piece of performance information, and a fourth method of combining the second and third methods.

Among the above, the first method is a method of calculating, as the index, the average of the inverse number of the CPU utilization and the port utilization of the respective elements for each resource configuration according to the following formula with the CPU utilization of the host computer 2 as HtCu, the CPU utilization of the file storage apparatus 3 as FsCu, the CPU utilization of the block storage apparatus 4 as BsCu, the port utilization of the host computer 2 as HtPu, the port utilization of the file storage apparatus 3 as FsPu, and the port utilization of the block storage apparatus 4 as BsPu, and setting the resource configuration with a higher value to have a higher priority.

[Formula 1]

$$\text{Index} = (1/HtCu + 1/HtPu + 1/FsCu + 1/FsPu + 1/BsCu + 1/BsPu)/6 \quad (1)$$

Incidentally, the reason why the "inverse number" is averaged in Formula (1) above is in order for a larger value to have higher priority since weighting is performed in the second to fourth methods as described later.

The second method is a method of calculating the index for each resource configuration according to the following formula with the weighting coefficient of the host computer 2 as WtHt, the weighting coefficient of the file storage apparatus 3 as WtFs, and the weighting coefficient of the block storage apparatus 4 as WtBs, and setting the resource configuration with a higher value to have a higher priority.

[Formula 2]

$$\text{Index} = \{WtHt \times (1/HtCu + 1/HtPu) + WtFs \times (1/FsCu + 1/FsPu) + WtBs \times (1/BsCu + 1/BsPu)\}/6 \quad (2)$$

In Formula (2) above, let it be assumed that the values of the respective weighting coefficients WtHt, WtFs and WtBs have been given to the management software 45 in advance by the system designer or the like. However, the system administrator may also be allowed to change the values of the foregoing weighting coefficients WtHt, WtFs and WtBs. Consequently, the weighting coefficient WtHt, WtFs or WtBs of the resource which the system administrator wishes to give priority can be changed to a larger value.

The third method is a method of calculating the index for each resource configuration according to the following formula with the weighting coefficients of the CPU utilization and port utilization ratio of the respective resources respectively as WtCu and WtPu, and setting the resource configuration with a higher value to have a higher priority.

[Formula 3]

$$\text{Index} = \{WtCu \times (1/HtCu + 1/FsCu + 1/BsCu) + WtPu \times (1/HtPu + 1/FsPu + 1/BsPu)\}/6 \quad (3)$$

In Formula (3) above, let it be assumed that the values of the respective weighting coefficients WtCu and WtPu have been given to the management software in advance by the system designer or the like. However, the system administrator may also be allowed to change the values of the foregoing weighting coefficients WtCu and WtPu. Consequently, the weighting coefficient WtCu or WtPu of the resource which the system administrator wishes to give priority can be changed to a larger value.

The fourth method is a method of calculating the index for each resource configuration according to the following formula with the respective weighting coefficients of the CPU utilization and port utilization of the host computer 2 as WtHtCu and WtHtPu, the respective weight coefficients of the CPU utilization and port utilization of the file storage apparatus 3 as WtFsCu and WtFsPu, and the respective weight coefficients of the CPU utilization and port utilization of the block storage apparatus 4 as WtBsCu and WtBsPu, and setting the resource configuration with a higher value to have a higher priority.

[Formula 4]

$$\text{Index} = \{WtHtCu \times (1/HtCu) + WtHtPu \times (1/HtPu) + \\ WtFsCu \times (1/FsCu) + WtFsPu \times (1/FsPu) + WtBsCu \times \\ (1/BsCu) + WtBsPu \times (1/BsPu)\}/6 \quad (4)$$

In Formula (4) above, let it be assumed that the values of the respective weighting coefficients WtHtCu, WtHtPu, WtFsCu, WtFsPu, WtBsCu and WtBsPu have been given to the management software in advance by the system designer or the like. However, the system administrator may also be allowed to change the values of the foregoing weighting coefficients WtHtCu, WtHtPu, WtFsCu, WtFsPu, WtBsCu and WtBsPu. Consequently, the weighting coefficient WtHtCu, WtHtPu, WtFsCu, WtFsPu, WtBsCu or WtBsPu of the resource which the system administrator wishes to give priority can be changed to a larger value.

When the resource search module 47 determines the priority of the respective resource configurations according to the foregoing method, it thereafter creates the search result display screen 70 (FIG. 16) so that the schematic diagrams 71A, 71B of the resource configuration with higher priority are displayed at a higher position on the screen. Here, although the resource search module 47 uses the port IDs stored at step SP7 and step SP6 or step SP10 of the foregoing first resource configuration search processing as the port ID of the ports that are available in the host computer 2 and the port ID of the ports in the file storage apparatus 3 that is available for the connection between the file storage apparatus 3 and the block storage apparatus 4, it uses the port IDs acquired from the resource management table 56 as the port ID of the other ports.

Subsequently, the resource search module 47 displays the created search result display screen 70 on the management server 5 (SP23), thereafter ends the search result display processing and returns to the first resource configuration search processing.

(1-7) Effect of this Embodiment

As described above, with the computer system 1 according to the present embodiment, the management server 5 collects and manages the configuration information from the respective host computers 2, file storage apparatuses 3 and block storage apparatuses 4, searches for the resource configuration that is optimal for the type of application that was designated by the system administrator based on the foregoing configuration information and a policy (consolidation management policy table 55) given in advance, and presents the search result to the system administrator.

Accordingly, the system administrator is able to create a resource configuration that is optimal for the application to be newly installed without requiring knowledge and experience regarding the various types of applications or the characteristics and functions of the respective host computers 2, file storage apparatuses 3 and block storage apparatuses 4.

Consequently, according to the present embodiment, it is possible to realize a computer system capable of facilitating, in a large-scale data center in which numerous block storage apparatuses 3 and file storage apparatuses 3 coexist, the management of properly using the block storage apparatus 3 and the file storage apparatus 3 and searching for available resources without having to replace the storage apparatuses.

(2) Second Embodiment

Figure 19:
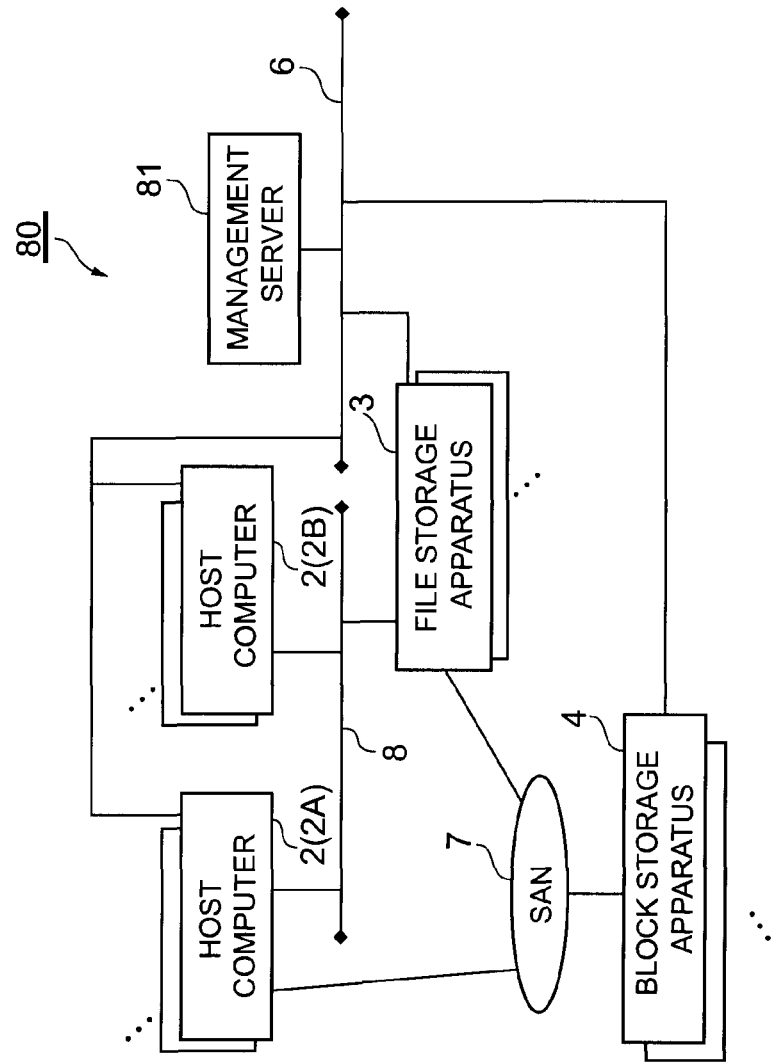
FIG. 19 is a block diagram showing the overall configuration of the computer system according to the second embodiment.

FIG. 19, in which the same reference numerals are given to the corresponding components of FIG. 1, shows a computer system 80 according to the second embodiment. The computer system 80 is configured the same as the computer system 1 according to the first embodiment excluding the configuration of the management server 81.

Figure 20:
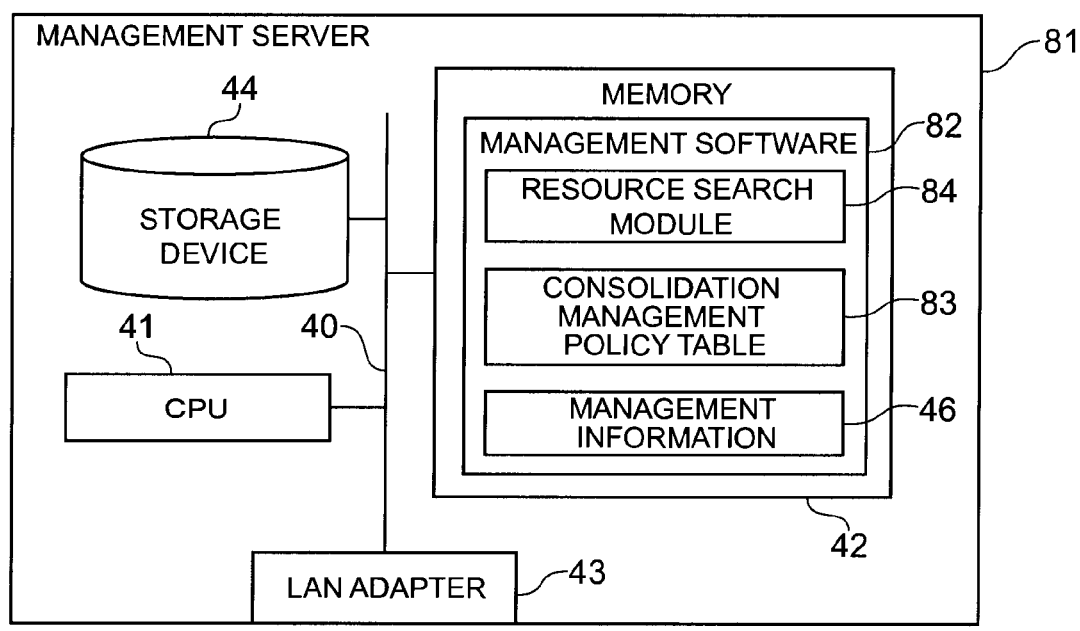
FIG. 20 is a block diagram showing the schematic configuration of the management server according to the second embodiment.

As shown in FIG. 20 in which the same reference numerals are given to the corresponding components of FIG. 5, the management server 81 is configured the same as the management server 5 (FIG. 5) according to the first embodiment excluding the configuration of the consolidation management policy table 83 and the resource search module 84 of the management software 82.

Here, the consolidation management policy table 83 according to the present embodiment is configured, as shown in FIG. 21, from an application type column 83A, a data type column 83B, a virtual host in-use interface column 83C, a file storage type column 83D and a volume type column 83E. The application type column 83A, the virtual host in-use interface column 83C, the file storage type column 83D and the volume type column 83E store the same information as the information that is stored in the application type column 55A, the virtual host in-use interface column 55B, the file storage type column 55C and the volume type column 55D in the consolidation management policy table 55 according to the first embodiment described above with reference to FIG. 13.

The data type column 83B stores the character string information of either "Active" or "Archive." The virtual host in-use interface column 83C, the file storage type column 83D and the volume type column 83E of the row in which the character string information of "Active" is stored in the data type column 83B respectively store the policy (interface of the virtual host in-use, type of file storage apparatus 3, and type of volume) to be applied to the reading and writing of the data (hereinafter referred to as the "active data") to be used by the respective applications. Specifically, information of the row in which the character string information of "Active" is stored in the data type column has the same meaning as the corresponding information in the consolidation management policy table 55 (FIG. 13) of the first embodiment.

Meanwhile, the virtual host in-use interface column 83C, the file storage type column 83D and the volume type column 83E of the row in which the character string information of "Archive" is stored in the data type column 83B respectively store the policy (interface of the virtual host in-use, type of file storage apparatus 3, and type of volume) to be applied to the storage of data in which active data at a certain point in time was archived (data in which the active data was transferred or copied for long-term storage; hereinafter referred to as the "archive data"). In this embodiment, although only the two data types of "Active" and "Archive" are illustrated as example of the data type to be stored in the data type column 83B, data types other than "Active" and "Archive" may also be adopted.

Figure 22:
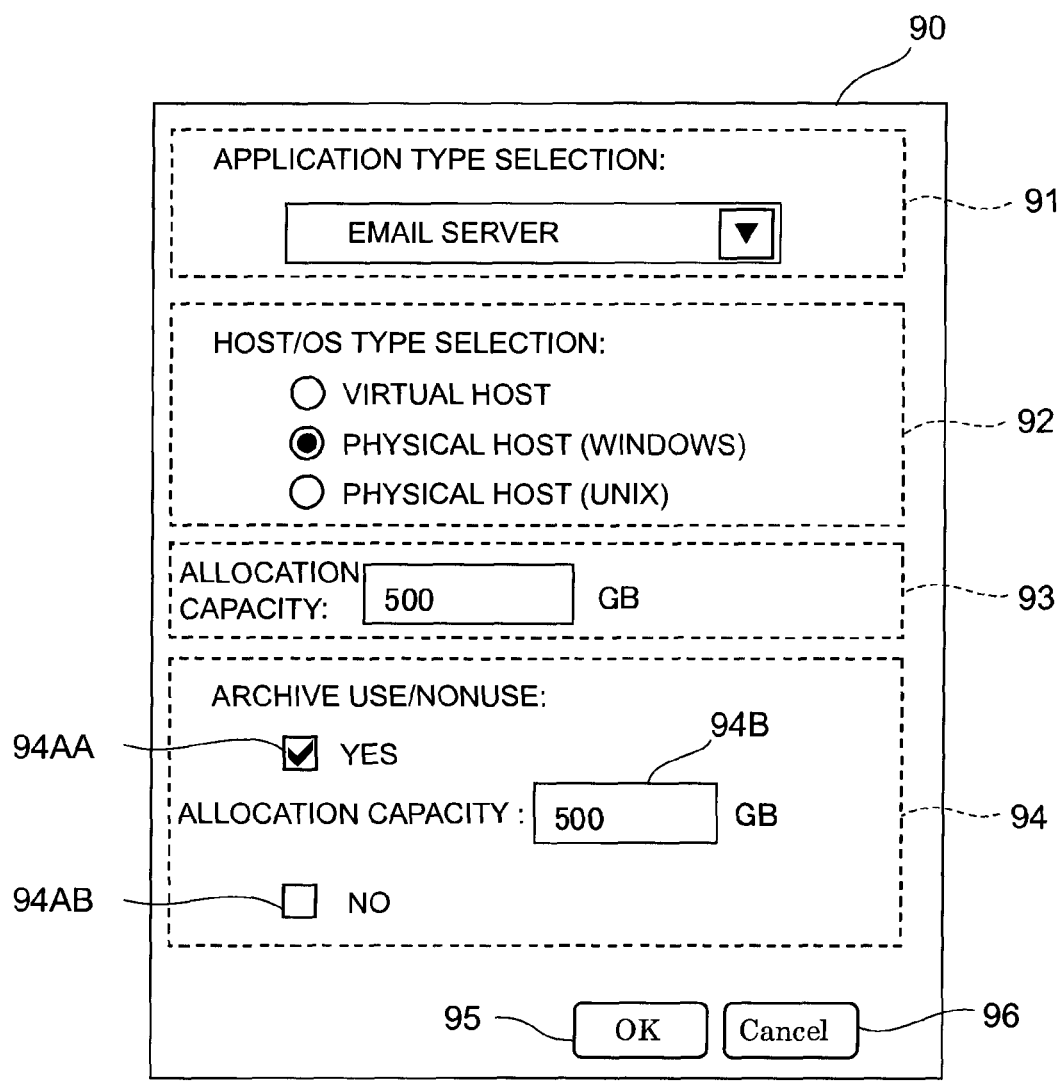
FIG. 22 is a schematic diagram showing a configuration example of the search condition designation screen according to the second embodiment.

FIG. 22 shows a configuration example of the search condition designation screen 90 according to the second embodiment to be displayed on the management serve 81 based on prescribed operations. The search condition designation screen 90 is configured from an application type selection field 91, a host/OS type selection field 92, an allocation capacity field 93, an archive use/nonuse field 94, an OK button 95 and a cancel button 96.

Among the above, the application type selection field 91, the host/OS type selection field 92, the allocation capacity field 93, the OK button 95 and the cancel button 96 have the same configuration and function as the corresponding components of the search condition designation screen 60 according to the first embodiment described above with reference to FIG. 15, and the explanation thereof is omitted.

Meanwhile, the archive use/nonuse field 94 is a field for the system administrator to designate whether the application to be installed will use an archive and, if so, how much capacity is to be allocated to the archive.

In reality, the archive use/nonuse field 94 is provided with check boxes 94AA, 94AB that respectively correspond to the words "YES" and "NO," and a check mark can be displayed only on either check box 94AA, 94AB. Consequently, the system administrator is able to designate whether or not the archive will be used by displaying a check mark in the check box 94AA corresponding to "YES" if the application will use the archive, and displaying a check mark in the check box 94AB corresponding to "NO" if the application will not use the archive.

Moreover, the archive use/nonuse field 94 is provided with an archive allocation capacity display unit 94B. Consequently, the system administrator is able to operate the management server 81 and input the capacity of the archive to be allocated to the new application to be installed in the archive allocation capacity display unit) 94B.

With the search condition designation screen 90, by performing the necessary input operations in the application type selection field 91, the host/OS type selection field 92, the allocation capacity field 93 and the archive use/nonuse field 94 and thereafter clicking the OK button 95, it is possible to cause the management server 81 to search, in accordance with the input conditions, the host computer 2 to which the application is to be installed, the file storage apparatus 3 that is suitable for that application, the block storage apparatus 4 for storing the active data of that application, and the block storage apparatus 4 for storing the archive data of that application (this search processing is hereinafter referred to as the "second resource configuration search processing").

Figure 23:
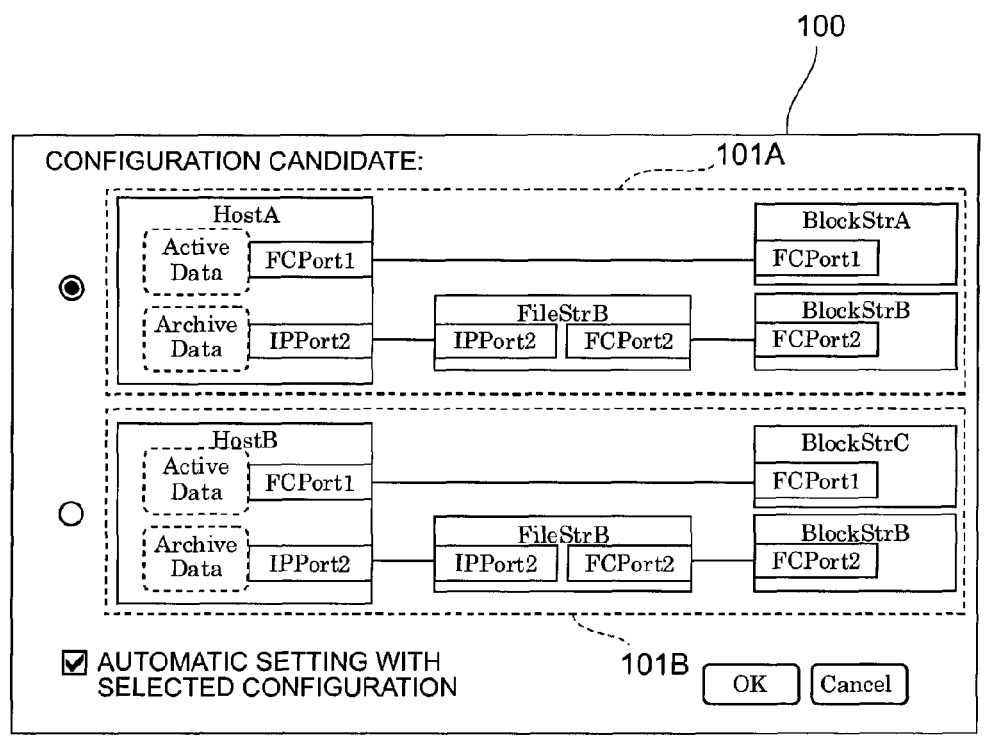
FIG. 23 is a schematic diagram showing a configuration example of the search result display screen according to the second embodiment.

FIG. 23 shows a configuration example of the search result display screen 100 according to the second embodiment to be displayed on the management server 81 as a result of executing the foregoing second resource configuration search processing. The search result display screen 100 displays the resource configuration (respective resources and their connection mode) that is optimal for the new application to be installed as detected in the second resource configuration search processing as schematic diagrams 101A, 1018 including the resource ID of the resources and the port ID of the ports to be used by the foregoing resources in the connection with other resources.

Incidentally, FIG. 23 shows a configuration example of the search result display screen 100 that is displayed when instructions for archiving the archive data of the application is given (that is, when a check mark is displayed in the check box 94AA corresponding to "YES") in the search condition designation screen 90 described above with reference to FIG. 22. Here, the schematic diagrams 101A, 1018 of the resource configuration including the configuration to be used by the application for the active data and the configuration to be used by the application for the archive data are displayed. Sections other than the schematic diagrams 101A, 1018 are the same as the search result display screen 70 according to the first embodiment described above with reference to FIG. 16.

Figure 24:
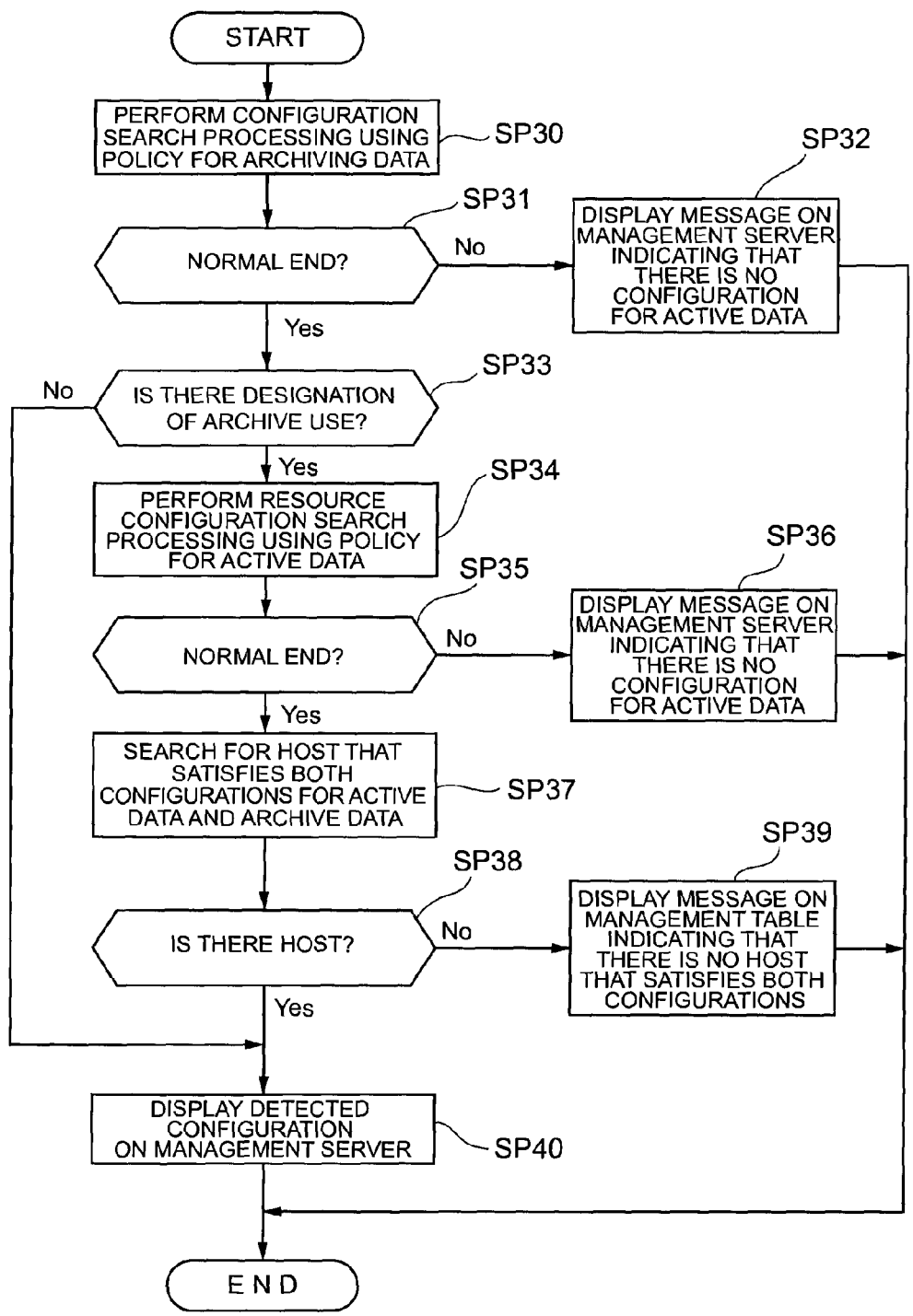
FIG. 24 is a flowchart showing the processing routine of the second resource configuration search processing.

FIG. 24 shows the processing routine of the second resource configuration search processing to be executed by the resource search module 84 (FIG. 20) of the management software 82 (FIG. 20) of the management server 81 when the system administrator performs the necessary input operations on the search condition designation screen 90 described above with reference to FIG. 22 and thereafter clicks the OK button 95.

When the necessary input operations are performed on the search condition designation screen 90 and the OK button 95 is thereafter clicked, the resource search module 84 starts the second resource configuration search processing shown in FIG. 24, and foremost executes the first resource configuration search processing described above with reference to FIG. 17 using the policy for active data among the policies that are registered in the consolidation management policy table 83 described above with reference to FIG. 21 (SP30).

However, at step SP30, the first resource configuration search processing is error ended without performing the processing of step SP3, step SP9 or step SP12 even when a negative result is obtained at step SP2, step SP8 or step SP11 of FIG. 17. Moreover, at step SP30, the first resource configuration search processing is ended without executing the processing of step SP13 even when a positive result is obtained at step SP11.

Subsequently, the resource search module 84 determines whether the first resource configuration search processing normally ended at step SP30 (SP31). If the resource search module 84 obtains a negative result in the foregoing determination, it displays a warning on the management server 81 to the effect that a resource configuration for active data cannot be created (SP32), and thereafter error ends the second resource configuration search processing.

Meanwhile, if the resource search module 84 obtains a positive result in the determination at step SP31, it determines whether instructions on whether to use the archive have been given on the search condition designation screen 90 (FIG. 22) (SP33).

If the resource search module 84 obtains a negative result in the foregoing determination, it creates the search result display screen 100 (FIG. 23) depicting the schematic diagrams 71A, 71B of the resource configuration detected in the processing at step SP30 by executing the search result display processing described above with reference to FIG. 18, and displays this on the management server 5 (SP40). The resource search module 84 thereafter ends the second resource configuration search processing.

Meanwhile, if the resource search module 84 obtains a positive result in the determination at step SP33, it executes the first resource configuration search processing described above with reference to FIG. 17 using the policy for archive data among the policies that are registered in the consolidation management policy table 83 (FIG. 21). Here, as the value of the allocation capacity to be used as the search condition, the value input into the archive allocation capacity display unit 94B of the search condition designation screen 90 is used (SP34).

However, at step SP34 also, the first resource configuration search processing is error ended without performing the processing of step SP3, step SP9 or step SP12 even when a negative result is obtained at step SP2, step SP8 or step SP11 of FIG. 17. At step SP34 also, the first resource configuration search processing is ended without executing the processing of step SP13 even when a positive result is obtained at step SP11.

Subsequently, the resource search module 84 determines whether the first resource configuration search processing normally ended at step SP34 (SP35). If the resource search module 84 obtains a negative result in the foregoing determination, it displays a warning on the management server 81 to the effect that a resource configuration for archive data cannot be detected (SP36), and thereafter error ends the second resource configuration search processing.

Meanwhile, if the resource search module 84 obtains a positive result in the determination at step SP35, it refers to the resource management table 56 (FIG. 14) and searches for a host computer 2 that is jointly common to any one of the resource configurations for active data obtained in the search of step SP30 and any one of the resource configurations for archive data obtained in the search of step SP34 (SP37), and determines whether such a host computer 2 was detected (SP38).

If the resource search module 84 obtains a negative result in the foregoing determination, it displays a warning on the management server 81 to the effect that there is not host computer 2 that is common to both the resource configuration for active data and the resource configuration for archive data, and thereafter ends the second resource configuration search processing.

Meanwhile, if the resource search module 84 obtains a positive result in the determination at step SP38, it creates, by executing the search result display processing described above with reference to FIG. 18, the search result display screen 100 (FIG. 23) depicting the schematic diagrams 71A, 71B that combine the resource configuration for active data to be used by the host computer 2 detected in the search of step SP30 and the resource configuration for archive data to be used by that host computer 2, and displays this on the management server 81 (SP40). The resource search module 84 thereafter ends the second resource configuration search processing.

As described above, with the computer system 80 according to the present embodiment, since a preferred configuration is searched for each data type (active data or archive data), and the resource configuration that combines the configurations that are preferable for each data type is presented to the system administrator, even with respect to the applications for archiving data, the system administrator is able to create an optimal resource configuration without requiring knowledge and experience regarding the various types of applications or the characteristics and functions of the respective host computers 2, file storage apparatuses 3 and block storage apparatuses 4. Consequently, according to the present embodiment, it is possible to realize a computer system that is compatible with more types of applications in comparison to the first embodiment.

(3) Other Embodiments

In the foregoing first and second embodiments, although a case was explained for configuring the block storage apparatus 4 as shown in FIG. 4 as the storage apparatus for providing storage areas having respectively different characteristics to the host computer 2, the present invention is not limited thereto, and various other configurations may be broadly applied as the configuration of the block storage apparatus 4.

Moreover, in the foregoing first and second embodiments, although a case explained for configuring the host computer 2 and the file storage apparatus 3 as shown in FIG. 3 as the plurality of intermediate storage apparatuses for providing the storage areas provided by the block storage apparatus 4 to the host computer 2 with an interface that is different from the block storage apparatus 4, the present invention is not limited thereto, and various other configurations may be broadly applied as the configuration of the file storage apparatus 3.

Furthermore, in the foregoing first and second embodiments, although a case was explained where the configuration information to be collected by the management server 5 from the host computers 2, the file storage apparatuses 3 and the block storage apparatuses 4 and referred to upon searching for the resource configuration is the resource type and resource detail described above with reference to FIG. 11, the present invention is not limited thereto, and other configuration information may also be applied.

In addition, in the foregoing first and second embodiments, although a case was explained where the policy that is managed in the consolidation management policy table 55 (FIG. 13), 83 (FIG. 21) is the virtual host in-use interface, file storage type and volume type that are preferable for each application type, the present invention is not limited thereto, and other information may also be included therein.

The present invention can be broadly applies to computer systems in which a file storage apparatus and a block storage apparatus coexist.

What is claimed is:

1. A computer system, comprising:
host computers;
storage apparatuses coupled to the host computers and providing storage areas of different characteristics to the host computers;
intermediate storage apparatuses respectively coupled to the host computers and the storage apparatuses, and which provide the storage areas provided by the storage apparatuses to the host computers with an access interface protocol that is different from the storage apparatuses; and
a management apparatus configured to manage a pre-defined policy with a preferred type of interface, a preferred type of intermediate storage apparatus and a preferred type of a volume of a storage area for each type of application that is executed by the host computers, and configuration information of the host computers, the storage apparatuses and the intermediate storage apparatuses, the policy including a policy for active data and a policy for archive data, the policy for active data concerning access made from one of the host computers via an FC port directly to one of the storage apparatuses without access to one of the intermediate storage apparatuses, the policy for archive data concerning access made from one of the host computers via an IP port to one of the intermediate storage apparatuses,
wherein the management apparatus is configured to collect configuration information from the storage apparatuses, the intermediate storage apparatuses and the host computers, and
wherein the management apparatus, based on the collected configuration information concerning the storage apparatuses, the intermediate storage apparatuses and the host computers, the policy which includes both the policy for active data and the policy for archive data, a type of host computer designated by a user, a type of application designated by the user to be newly installed, a capacity designated by the user, and an indication designated by the user of whether or not archive data in addition to active data is to be used by the application, is configured to detect: the host computer of the type designated by the user; to determine whether or not the type of the intermediate storage apparatus that corresponds to the type of the application designated by the user to be newly installed is defined in the policy; if the policy defines use of the storage apparatuses without using the intermediate storage apparatuses, is configured to detect the storage apparatus that is coupled to the detected host computer and having a volume with the capacity designated by the user; if the policy defines the type of intermediate storage apparatus that corresponds to the type of the application, is configured to detect the intermediate storage apparatus that is coupled to the detected host computer and corresponds to the type of the application; and to detect the storage apparatus that is coupled to the detected intermediate storage apparatus and has a volume with the capacity designated by the user, and is configured to present a new combination of resources configured from the detected host computer, the detected intermediate storage apparatus, and the detected storage apparatus to the user in a selectable manner.

2. A computer system according to claim 1,
wherein the policy is pre-defined with a type of the access interface protocol that is preferable upon using a virtual host for each type of the application.

3. A computer system according to claim 1,
wherein the management apparatus is configured to display the detected combination as a schematic diagram representing a connection mode of the detected storage apparatus, the detected intermediate storage apparatus and the detected host computer, and routes for both the active data and the archive data, the detected combination displayed comprising a plurality of combinations displayed as a list of candidates selectable by the user.

4. A computer system according to claim 3,
wherein the schematic diagram includes identifying information of the detected storage apparatus, the detected intermediate storage apparatus and the detected host computer, and identifying information of a port to be used in the connection of the detected storage apparatus, the detected intermediate storage apparatus and the detected host computer.

5. A computer system according to claim 3,
wherein, if the management apparatus detects a plurality of combinations of a storage apparatus, an intermediate storage apparatus and a host computer that is suitable for the type of application designated by the user, the management apparatus is configured to collect performance information from the storage apparatuses and the intermediate storage apparatuses and host computers, configuring the combination for each of the combinations,
wherein the management apparatus is configured to calculate the priority of each of the combinations based on the collected performance information, and
wherein the management apparatus is configured to preferentially display a schematic diagram of the combination with a high priority based on the calculation result.

6. A computer system according to claim 5,
wherein the performance information is a utilization ratio of a processor governing the operational control of the overall storage apparatus, the overall intermediate storage apparatus or the overall host computer, and a utilization ratio of a port that is used for the connection in the corresponding combination.

7. A computer system according to claim 1,
wherein the policy is pre-defined with a type of the access interface protocol and a type of storage area that are preferable for each type of data regarding the type of each of the applications, and wherein the management apparatus is configured to detect a combination of a storage apparatus, an intermediate storage apparatus and a host computer that is suitable for the type of application designated by a user for each type of the data based on configuration information of each storage apparatus, each intermediate storage apparatus and each host computer, the policy, and the type of application designated by the user, and to present a combination of a storage apparatus, an intermediate storage apparatus and a host computer based on a detected combination of each type of data to the user.

8. A resource management method in a computer system comprising host computers, storage apparatuses providing storage areas of different characteristics to the host computers, and intermediate storage apparatuses providing the storage areas provided by the storage apparatuses to the host computers with an access interface protocol that is different from the storage apparatuses,
wherein a pre-defined policy with a preferred type of the access interface protocol, a preferred type of intermediate storage apparatus and a preferred type of a volume of a storage area for each type of application that is loaded in the host computers is predetermined, and configuration information of the host computers, the storage apparatuses and the intermediate storage apparatuses, the policy including a policy for active data and a policy for archive data, the policy for active data concerning access made from one of the host computers via an FC port directly to one of the storage apparatuses without access to one of the intermediate storage apparatuses, the policy for archive data concerning access made from one of the host computers via an IP port to one of the intermediate storage apparatuses,
wherein the method comprises:
a first step of collecting configuration information from the storage apparatuses, the intermediate storage apparatuses and the host computers;
a second step of, based on the collected configuration information concerning the storage apparatuses, the intermediate storage apparatuses and the host computers, the policy which includes both the policy for active data and the policy for archive data, a type of host computer designated by a user, a type of application designated by the user to be newly installed, a capacity designated by the user, and an indication designated by the user of whether or not archive data in addition to active data is to be used by the application, detecting: the host computer of the type designated by the user; determining whether or not the type of the intermediate storage apparatus that corresponds to the type of the application designated by the user to be newly installed is defined in the policy; if the policy defines use of the storage apparatuses without using the intermediate storage apparatuses, detecting the storage apparatus that is coupled to the detected host computer and having a volume with the capacity designated by the user; if the policy defines the type of intermediate storage apparatus that corresponds to the type of the application, detecting the intermediate storage apparatus that is coupled to the detected host computer and corresponds to the type of the application; and detecting the storage apparatus that is coupled to the detected intermediate storage apparatus and has a volume with the capacity designated by the user; and
a third step of presenting a new combination of resources configured from the detected host computer, the detected intermediate storage apparatus, and the detected storage apparatus to the user in a selectable manner.

9. A resource management method according to claim 8, wherein the policy is pre-defined with a type of the access interface protocol that is preferable upon using a virtual host for etch type of the application.

10. A resource management method according to claim 8, wherein, at the third step, the detected combination is displayed as a schematic diagram representing a connection mode of the detected storage apparatus, the detected intermediate storage apparatus and the detected host computer, and routes for both the active data and the archive data, the detected combination displayed comprising a plurality of combinations displayed as a list of candidates selectable by the user.

11. A resource management method according to claim 10, wherein the schematic diagram includes identifying information of the detected storage apparatus, the detected intermediate storage apparatus and the detected host computer, and identifying information of a port to be used in the connection of the detected storage apparatus, the detected intermediate storage apparatus and the detected host computer.

12. A resource management method according to claim 10, wherein, at the third step, if a plurality of combinations of a storage apparatus, an intermediate storage apparatus and a host computer that is suitable for the type of application designated by the user is detected, performance information is collected from a storage apparatus, an intermediate storage apparatus and a host computer configuring the combination for each of the combinations, wherein the priority of each of the combinations is calculated based on the collected performance information, and wherein a schematic diagram of the combination with a high priority is preferentially displayed based on the calculation result.

13. A resource management method according to claim 12, wherein the performance information is a utilization ratio of a processor governing the operational control of the overall storage apparatus, the overall intermediate storage apparatus or the overall host computer, and a utilization ratio of a port that is used for the connection in the corresponding combination.

14. A resource management method according to claim 8, wherein the policy is pre-defined with a type of the access interface protocol and a type of storage area that are preferable for each type of data regarding the type of each of the applications, wherein, at the second step, a combination of a storage apparatus, an intermediate storage apparatus and a host computer that is suitable for the type of application designated by a user for each type of the data is detected based on configuration information of each storage apparatus, each intermediate storage apparatus and each host computer, the policy, and the type of application designated by the user, and wherein, at the third step, a combination of a storage apparatus, an intermediate storage apparatus and a host computer based on a detected combination of each type of data is presented to the user.

\* \* \* \* \*